United States Patent
Reiker (12)

(10) Patent No.: US 6,207,894 B1
(45) Date of Patent: *Mar. 27, 2001

(54) LOAD SUPPORTING ELECTRICAL BOX SYSTEM SUITED FOR INSTALLATION IN CONCRETE AND HAVING ENLARGED CAVITY THEREIN

(75) Inventor: Kenneth H. Reiker, Shalimar, FL (US)

(73) Assignee: Reiker Enterprises of Northwest Florida Inc., Solvay, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/912,643

(22) Filed: Aug. 18, 1997

Related U.S. Application Data

(63) Continuation-in-part of application No. 08/381,434, filed on Jan. 31, 1995, now Pat. No. 5,661,264, and a continuation-in-part of application No. 08/905,142, filed on Aug. 1, 1997, now Pat. No. 5,981,874, and a continuation-in-part of application No. 08/905,077, filed on Aug. 1, 1997, now Pat. No. 5,907,124, and a continuation-in-part of application No. 08/862,380, filed on May 23, 1997.

(60) Provisional application No. 60/023,060, filed on Aug. 2, 1996, and provisional application No. 60/018,227, filed on May 24, 1996.

(51) Int. Cl.[7] ........................................... H02G 3/04
(52) U.S. Cl. ................................. 174/48; 52/220.8
(58) Field of Search ....................... 174/50, 51, 54, 174/57, 58, 63, 48, 61, 62; 220/3.4, 3.5, 3.6, 3.8, 3.92, 3.94, 4.02; 52/220.8; 248/906, 903, 323, 326, 343, 205.4, 217.3

(56) References Cited

U.S. PATENT DOCUMENTS

| Re. 33,147 | | 1/1990 | Reiker . | |
|---|---|---|---|---|
| Re. 34,603 | | 5/1994 | Caison et al. . | |
| D. 288,289 | | 2/1987 | Reiker . | |
| 950,176 | * | 2/1910 | Hublinger | 174/62 |
| 1,004,946 | * | 10/1911 | Wares et al. | 220/3.8 X |
| 1,066,706 | | 7/1913 | Caine . | |
| 1,592,990 | | 7/1926 | Raquette et al. . | |
| 1,824,708 | | 9/1931 | Davis et al. . | |
| 2,031,689 | | 2/1936 | Buckels . | |
| 2,031,914 | * | 2/1936 | Veysey et al. | 174/61 X |
| 2,305,015 | * | 12/1942 | Langer | 220/3.6 X |

(List continued on next page.)

FOREIGN PATENT DOCUMENTS 3403053   1/1984 (DE) .

Primary Examiner—Dean A. Reichard
(74) Attorney, Agent, or Firm—Shlesinger, Arkwright & Garvey LLP

(57) ABSTRACT

In one embodiment of the invention, the electrical fixture mounting assembly includes a junction box having a junction box cavity defined therein, and a mounting bracket disposed on the junction box. There is a fastener attachment site on the mounting bracket along with a fastener disposed thereon. The fastener is moveable between an extended position and a retracted position. The fastener is sufficiently long so that it extends outwardly of the junction box cavity when the fastener is in its extended position, and the fastener is contained substantially within the junction box cavity when the fastener is in its retracted position. The fastener and the fastener attachment site are configured so that a plastic coating on a plastic-coated wire is not abraded thereby. The box may be made of plastic and the fastener may be made of metal. There is likewise disclosed a method of installing an electrical fixture mounting assembly.

44 Claims, 27 Drawing Sheets

U.S. PATENT DOCUMENTS

| | | |
|---|---|---|
| 2,313,131 | 3/1943 | Elias . |
| 2,454,962 | 11/1948 | Brown . |
| 2,471,301 | 5/1949 | Boosey . |
| 2,588,760 * | 3/1952 | Pryne .................................. 174/58 X |
| 2,959,633 | 11/1960 | Palmer et al. . |
| 2,983,399 | 5/1961 | Slater et al. . |
| 3,168,613 | 2/1965 | Palmer . |
| 3,340,349 | 9/1967 | Zerwes . |
| 3,472,945 | 10/1969 | Trachtenberg . |
| 3,620,404 | 11/1971 | Grasso . |
| 3,622,029 | 11/1971 | Ware . |
| 3,846,604 | 11/1974 | Shallbetter . |
| 3,877,601 | 4/1975 | Evans et al. . |
| 4,176,758 | 12/1979 | Glick . |
| 4,180,226 | 12/1979 | Matte . |
| 4,263,472 | 4/1981 | Maheu . |
| 4,331,832 | 5/1982 | Curtis et al. . |
| 4,433,204 | 2/1984 | Wuertz . |
| 4,463,923 | 8/1984 | Reiker . |
| 4,620,061 * | 10/1986 | Appleton ................................ 174/51 |
| 4,642,956 | 2/1987 | Harbeke . |
| 4,684,092 | 8/1987 | Reiker . |
| 4,733,330 | 3/1988 | Tanaka et al. . |
| 4,873,600 * | 10/1989 | Vogele .............................. 174/50 X |
| 4,919,292 | 4/1990 | Hsu . |
| 4,960,964 * | 10/1990 | Schnell et al. ......................... 174/51 |
| 4,988,067 | 1/1991 | Propp et al. . |
| 5,115,862 * | 5/1992 | Hastings ............................ 174/51 X |
| 5,239,132 | 8/1993 | Bartow . |
| 5,257,487 * | 11/1993 | Bantz et al. ...................... 220/3.6 X |
| 5,303,894 | 4/1994 | Deschamp et al. . |
| 5,359,152 | 10/1994 | Hone-Lin . |
| 5,407,088 | 4/1995 | Jorgensen et al. . |
| 5,451,081 | 9/1995 | Kaucnik . |
| 5,486,650 | 1/1996 | Yetter . |
| 5,661,264 * | 8/1997 | Reiker .................................... 174/50 |
| 5,860,548 | 1/1999 | Kerr, Jr. . |

* cited by examiner

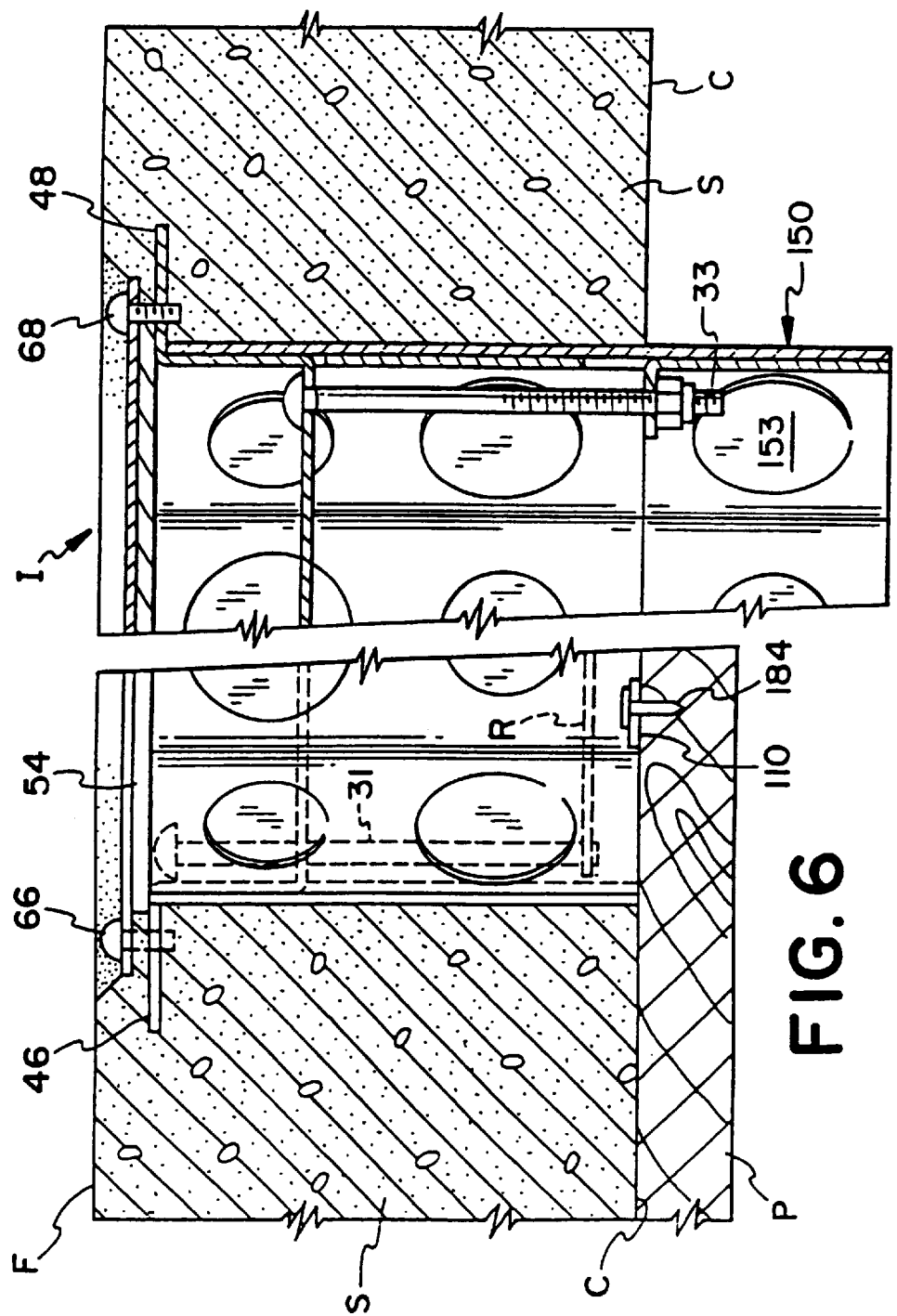

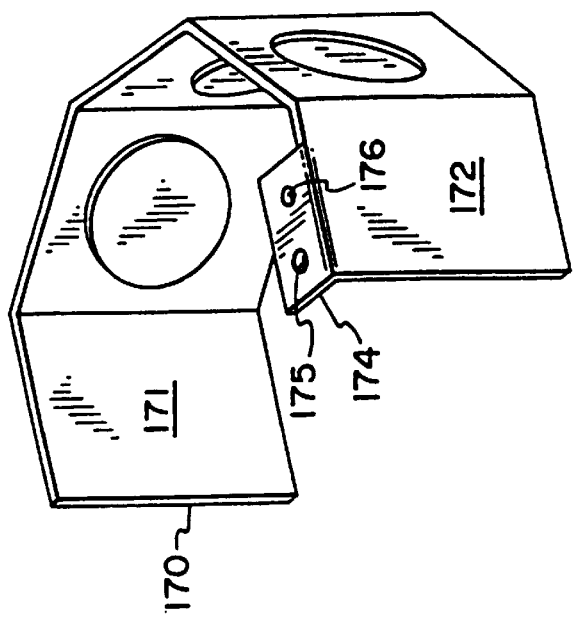
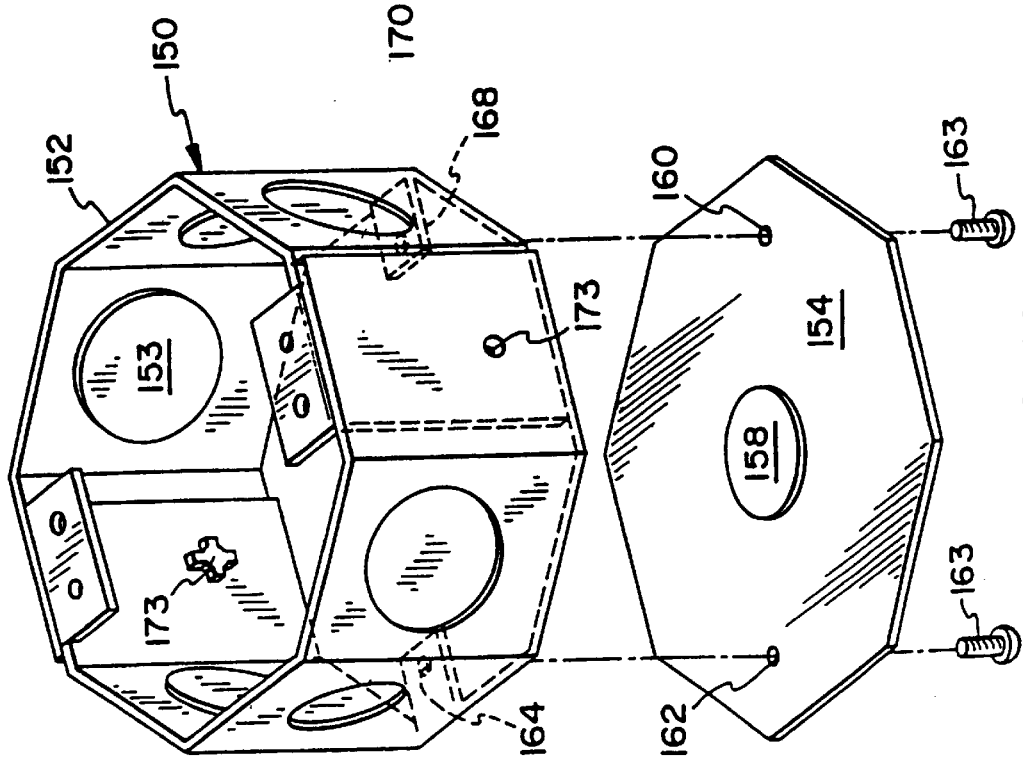
FIG. 8
FIG. 7

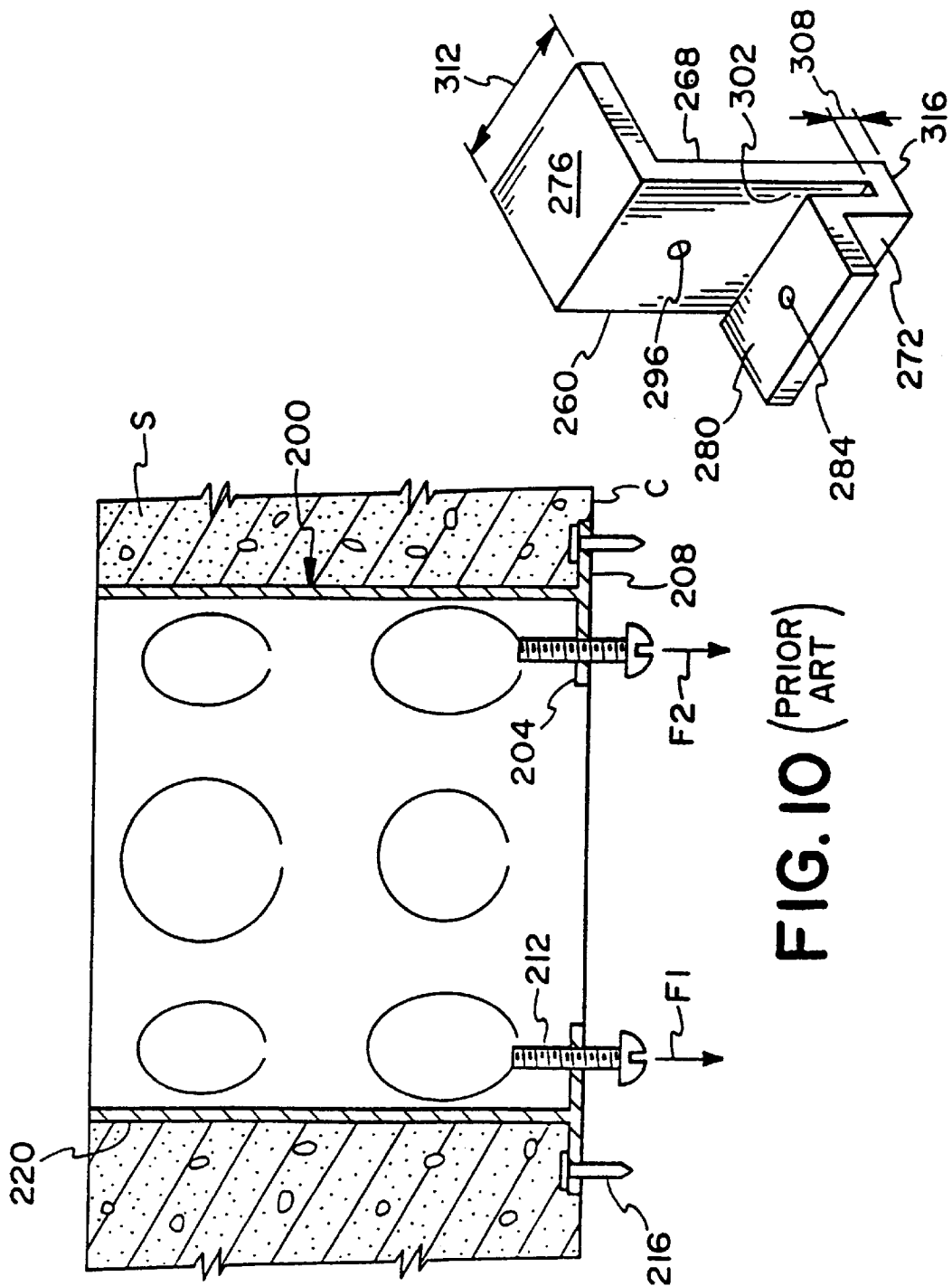

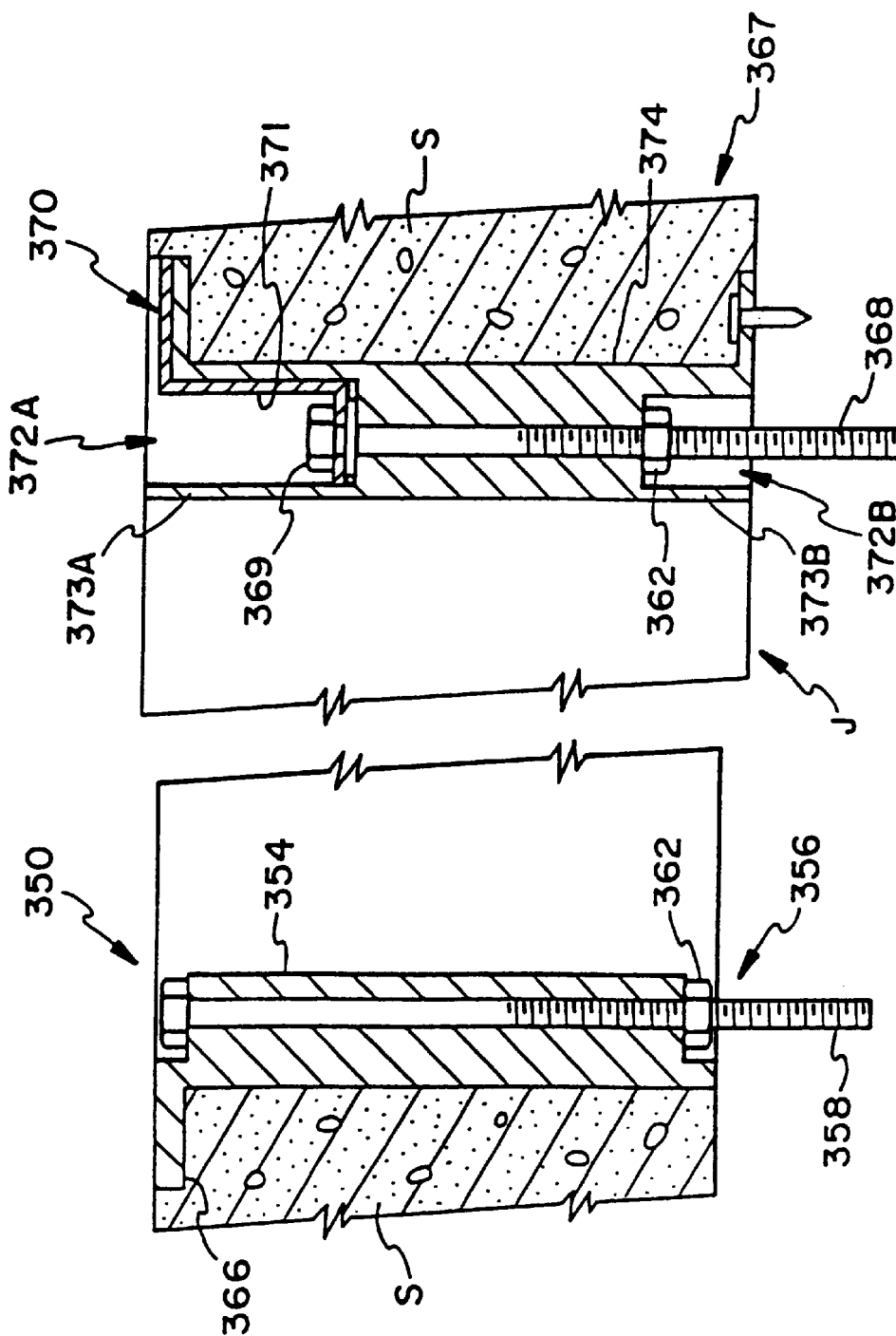

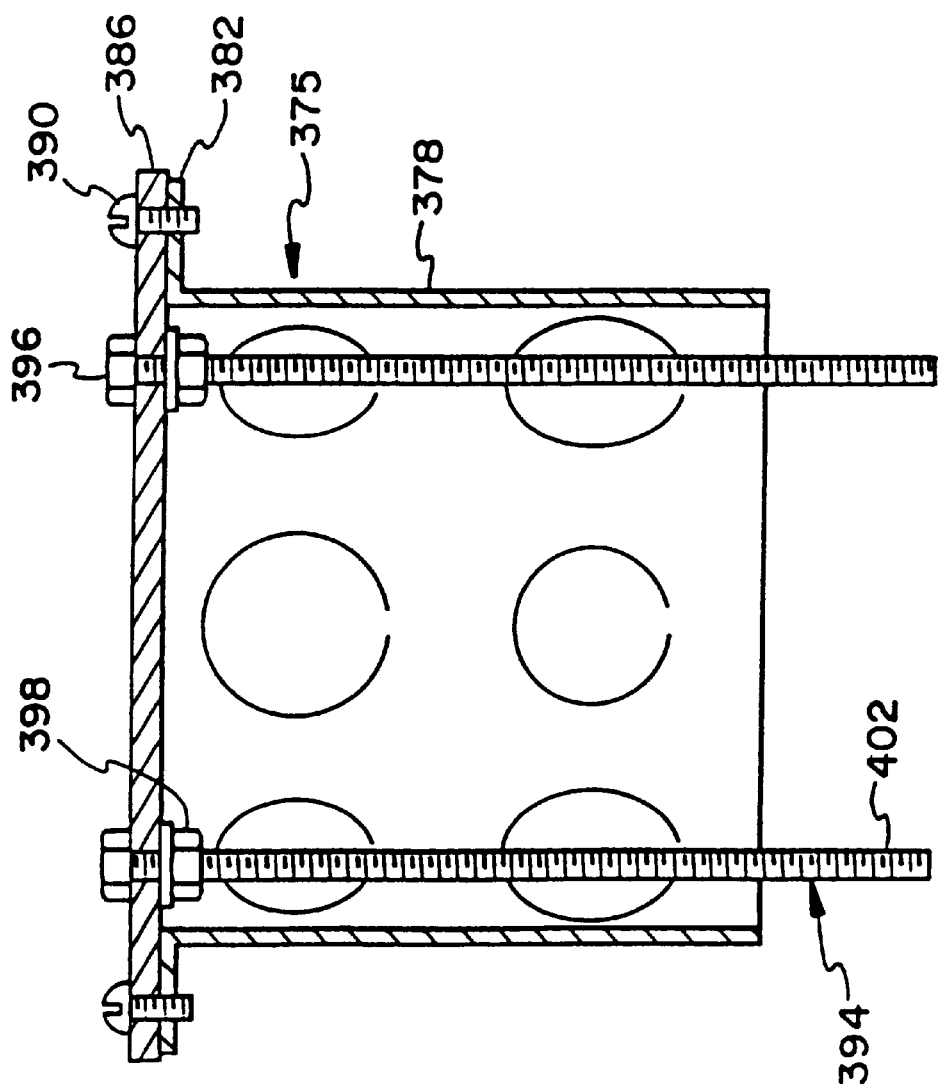

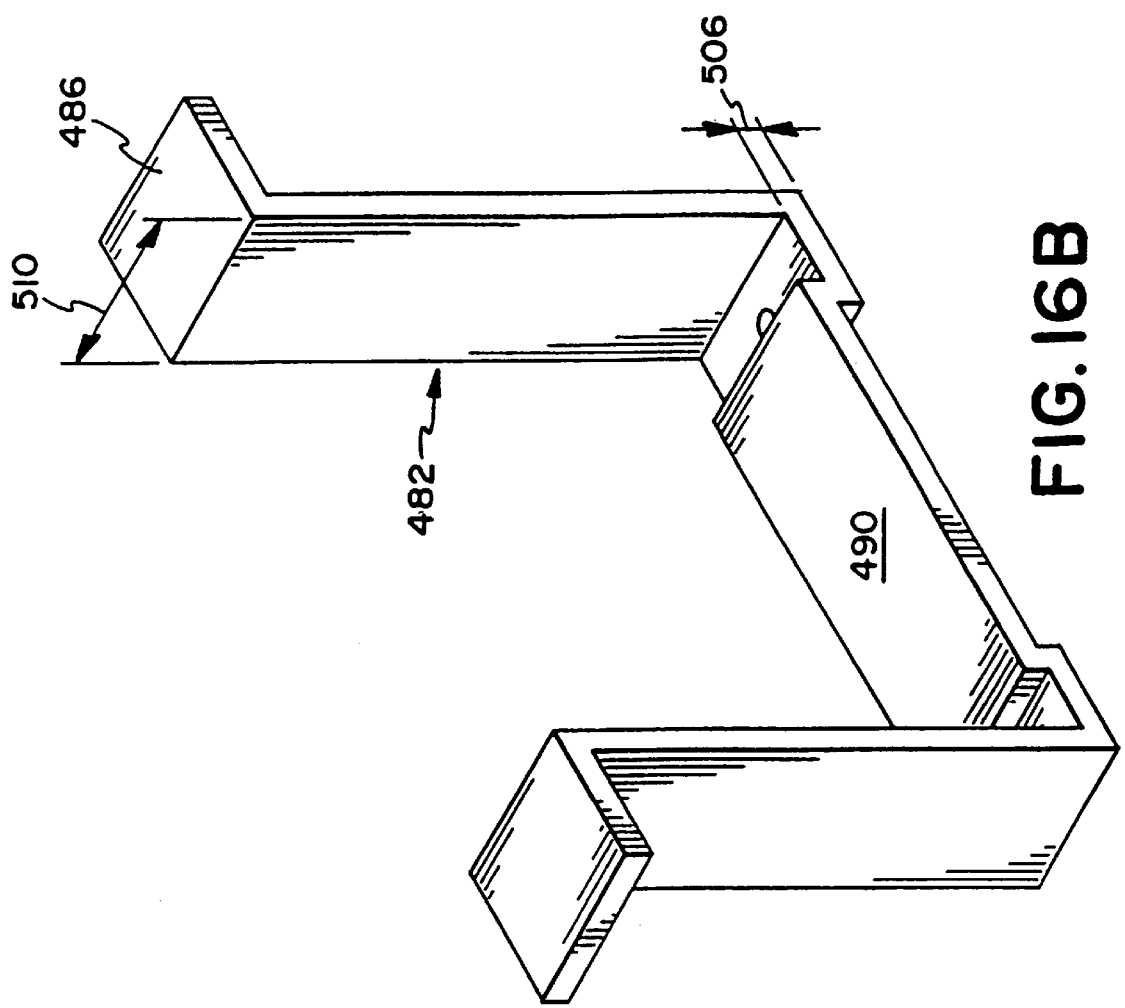

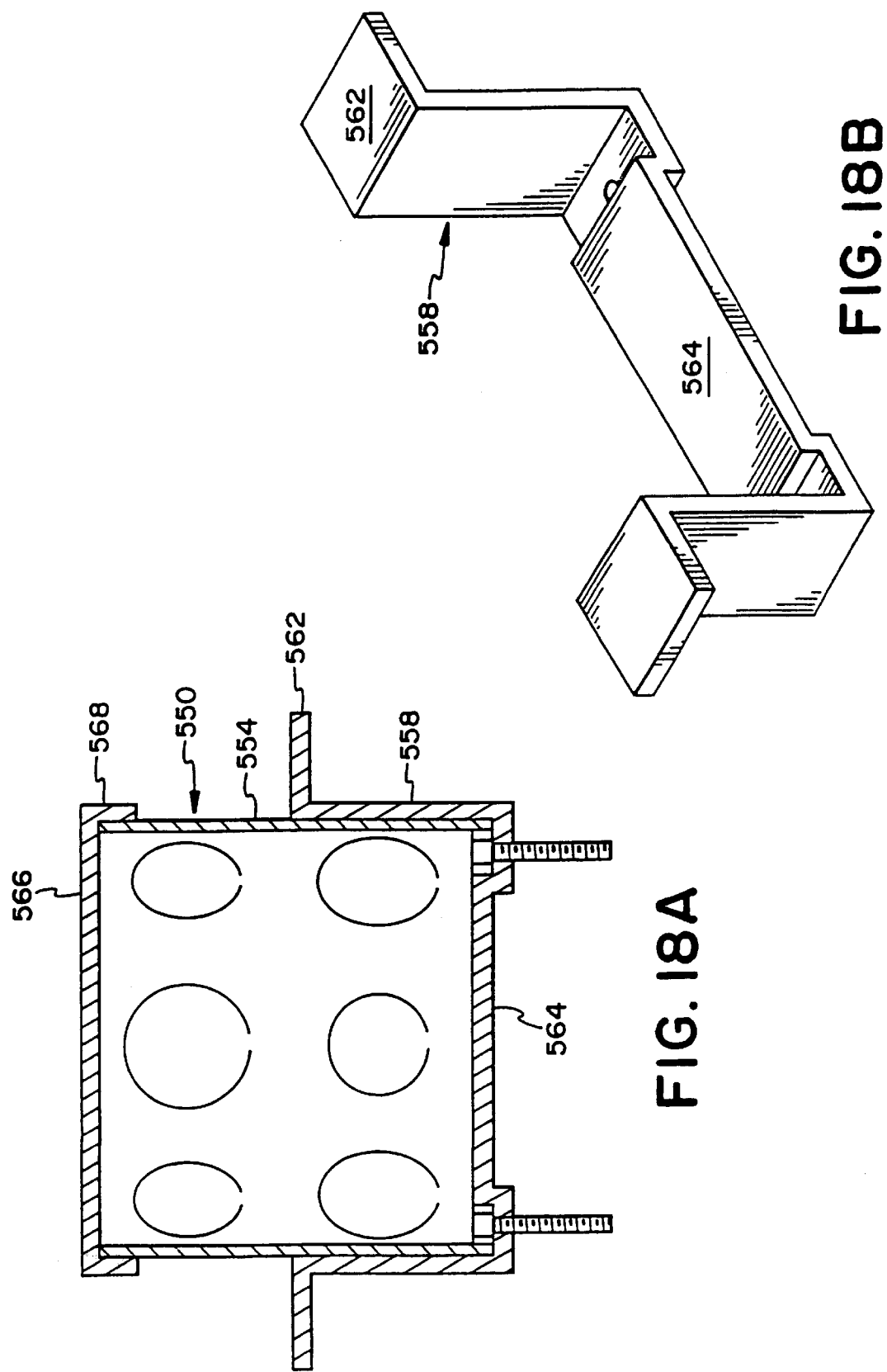

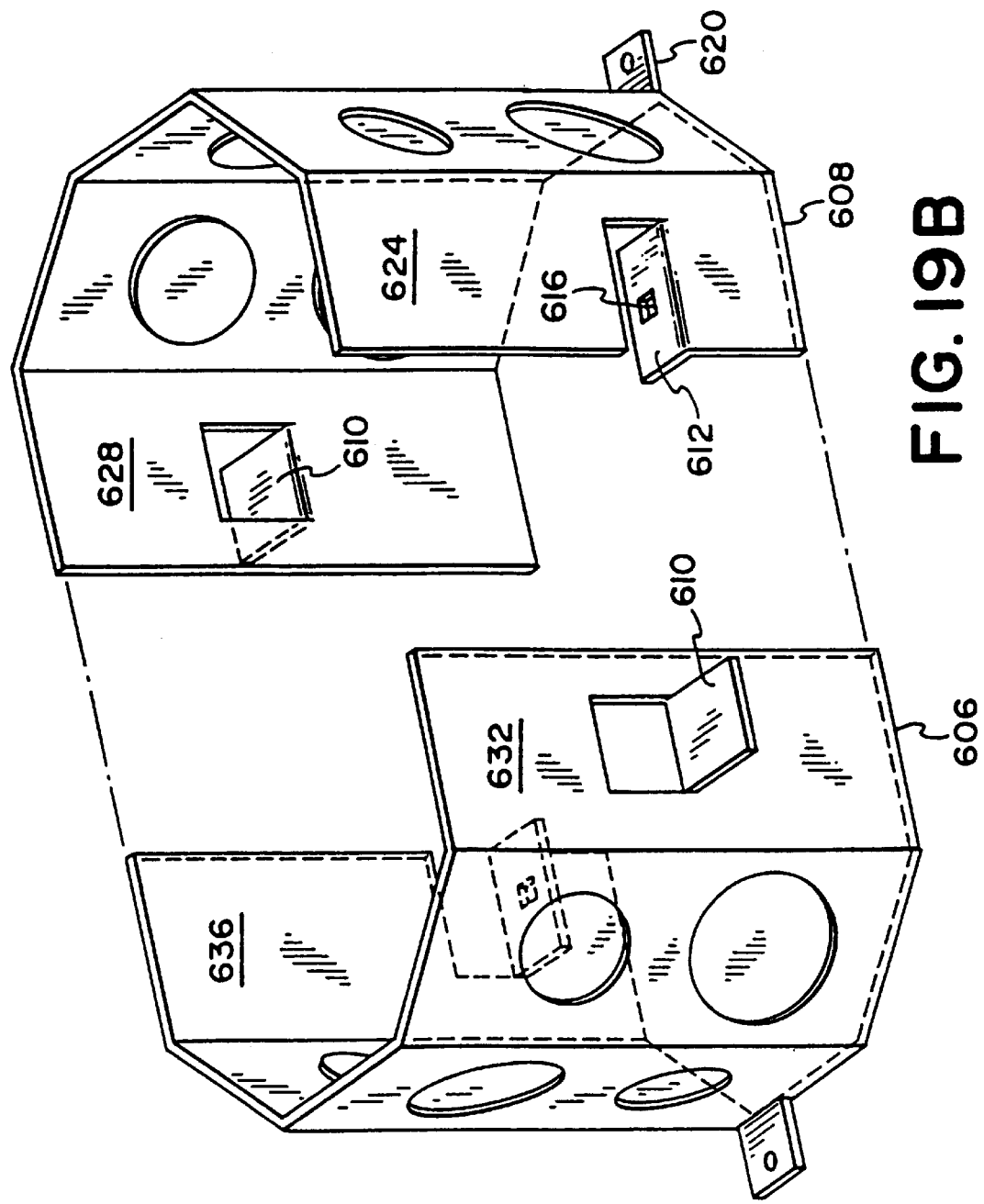

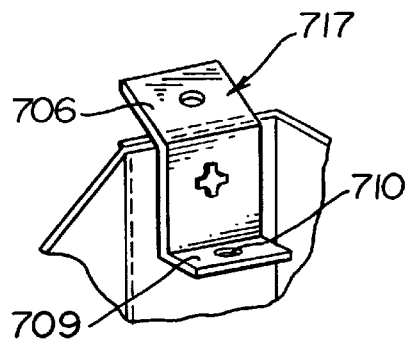
FIG.21a
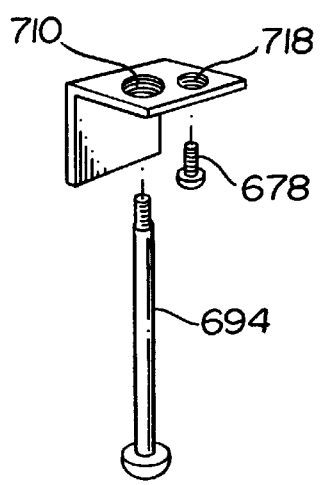
FIG.21b
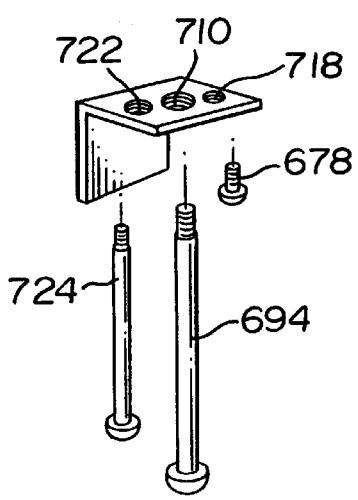
FIG.21c
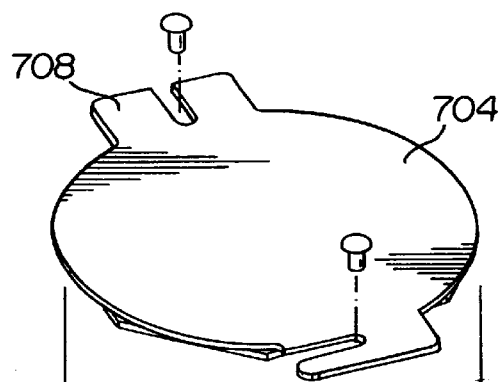
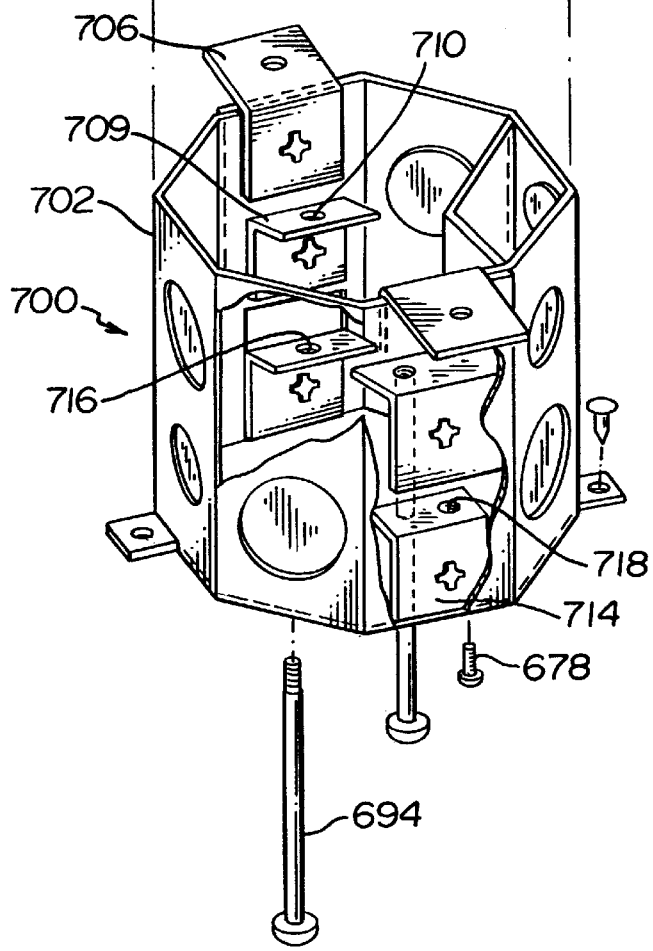
FIG.21

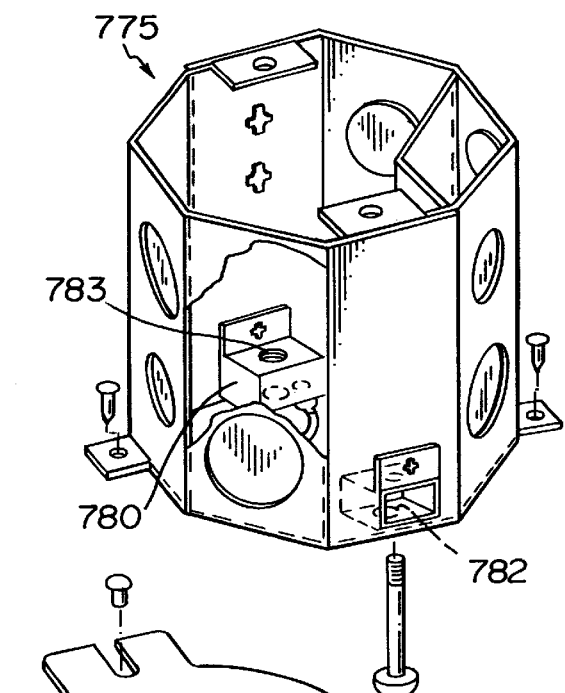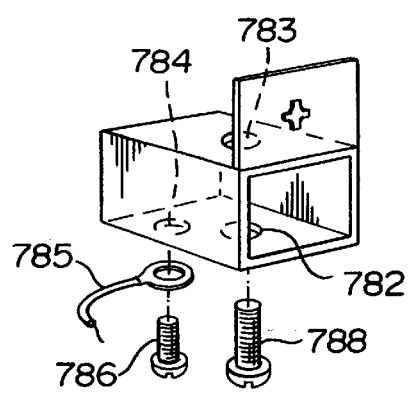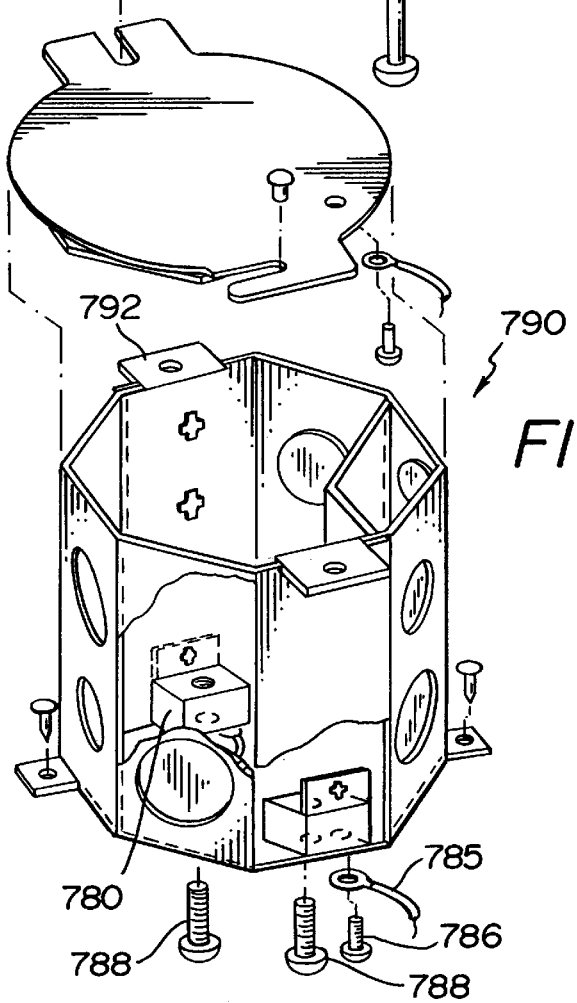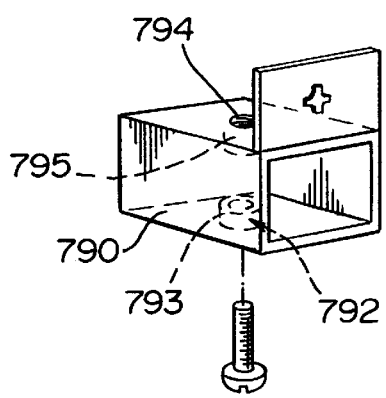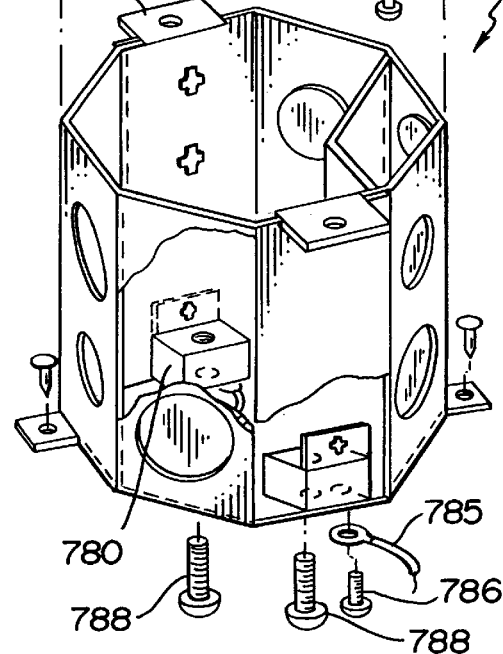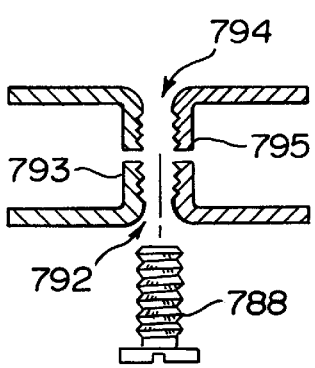

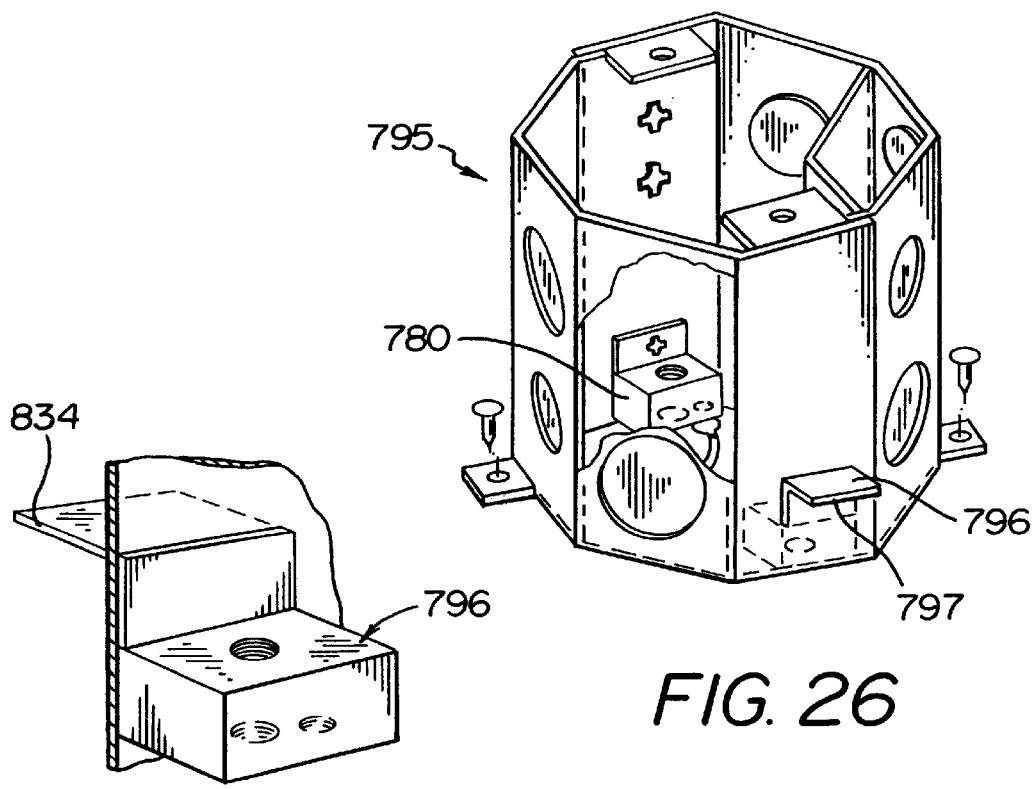
FIG. 26
FIG. 26a
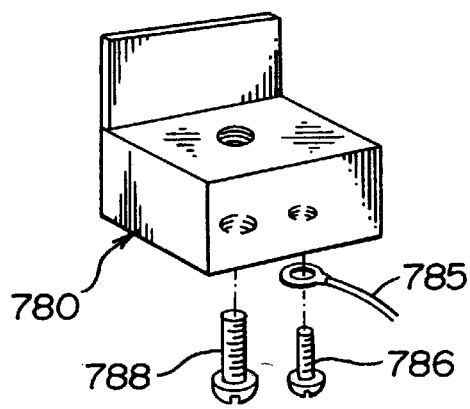
FIG. 26b
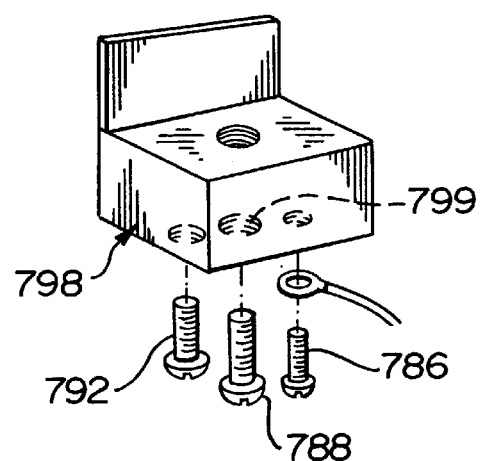
FIG. 26c

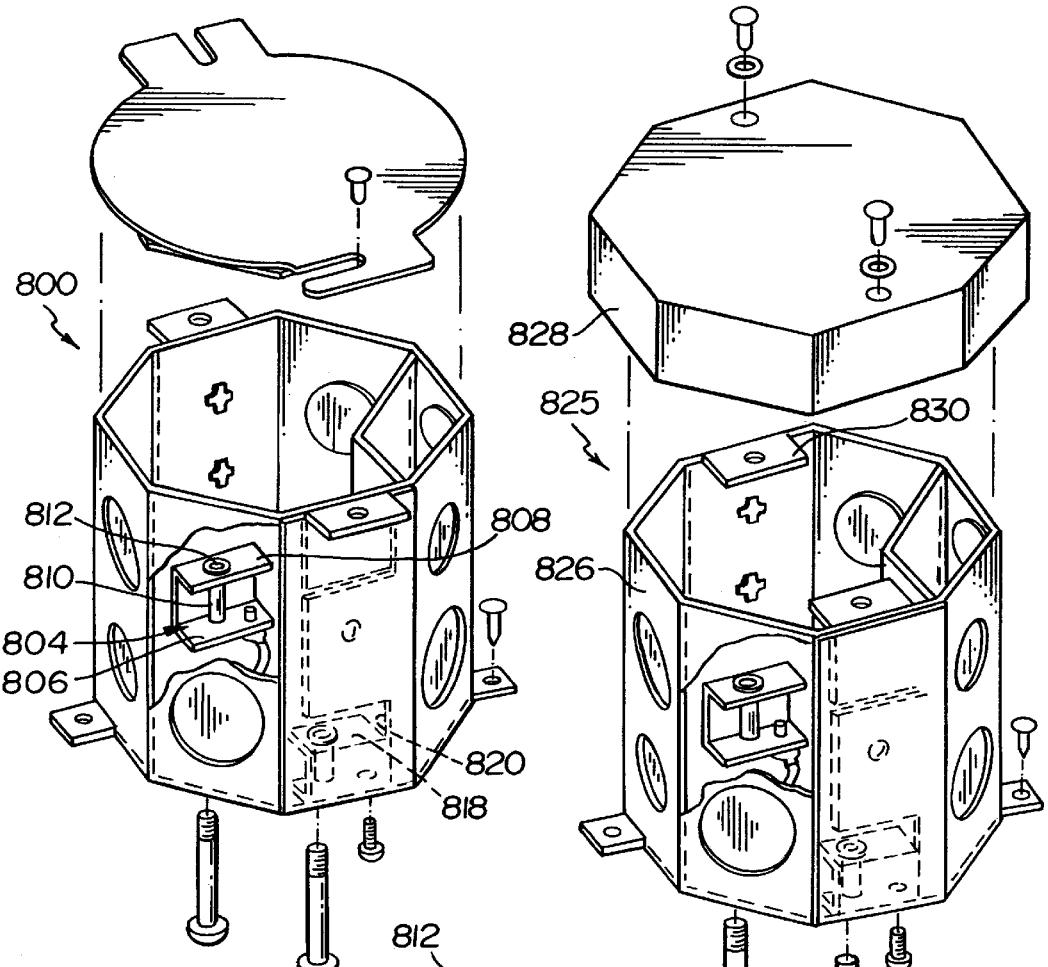
FIG. 27
FIG. 28
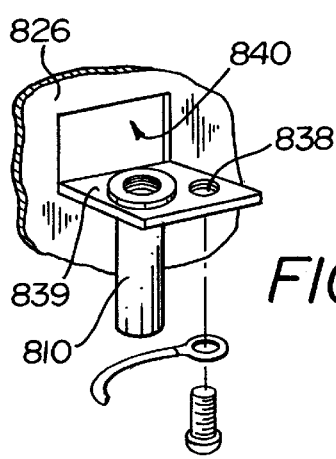
FIG. 28a
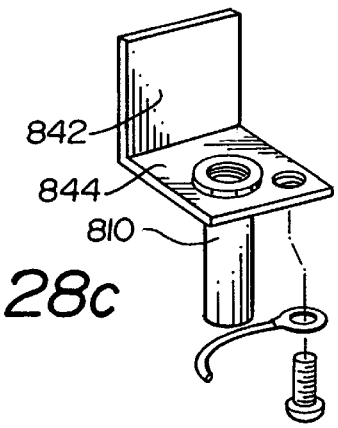
FIG. 28b
FIG. 28c

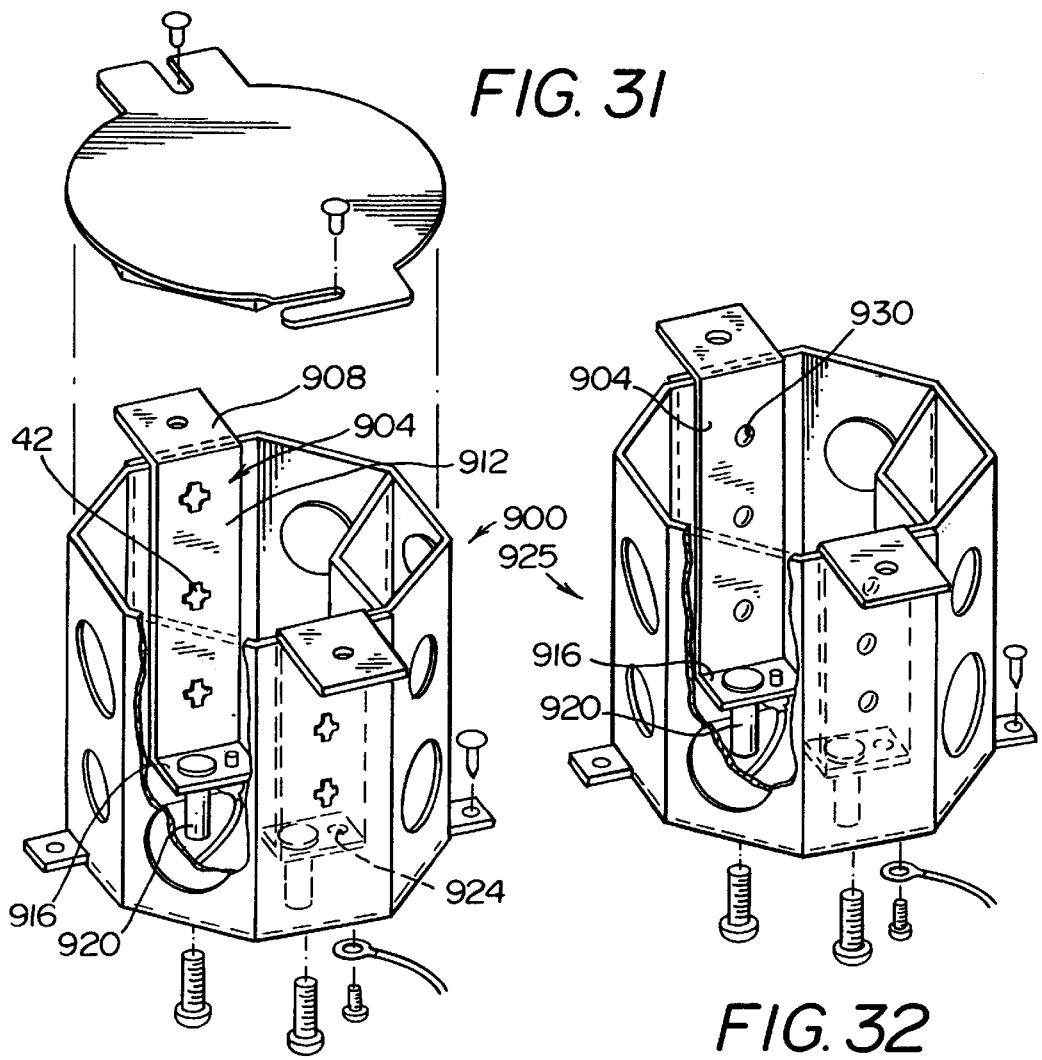
FIG. 31
FIG. 32
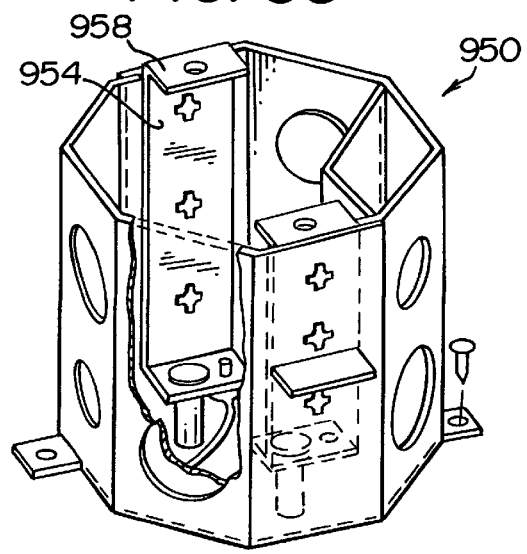
FIG. 33
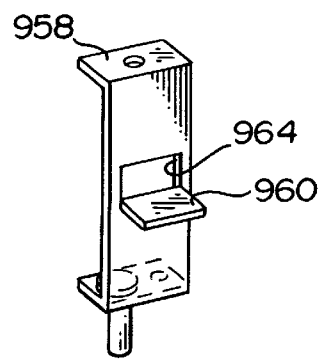
FIG. 33a

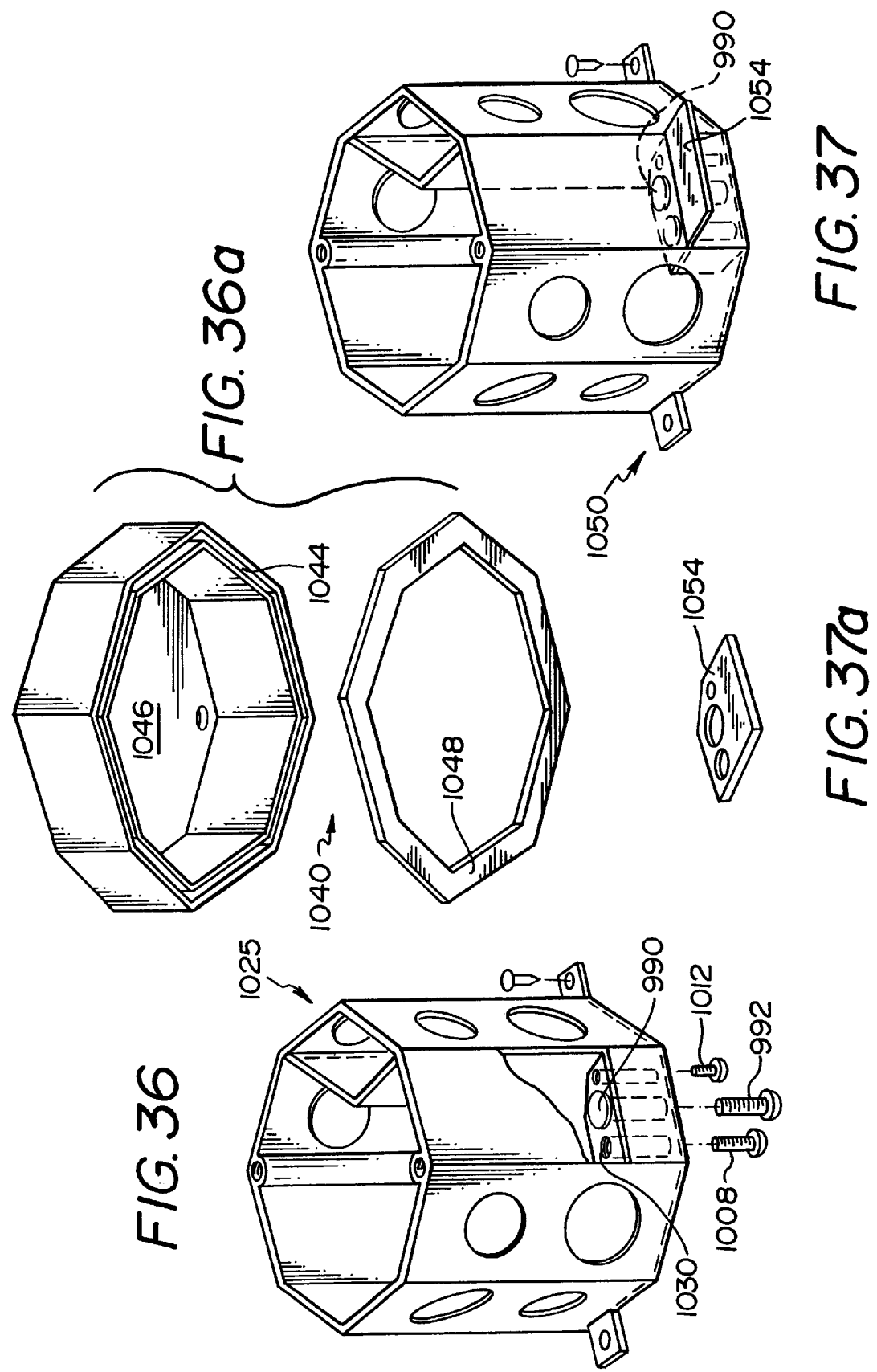

LOAD SUPPORTING ELECTRICAL BOX SYSTEM SUITED FOR INSTALLATION IN CONCRETE AND HAVING ENLARGED CAVITY THEREIN

CROSS-REFERENCE TO RELATED APPLICATIONS

This application is a continuation-in-part of application Ser. No. 08/381,434, filed Jan. 31, 1995, which is now U.S. Pat. No. 5,661,264, issued Aug. 26, 1997; and this application is a continuation-in-part of application Ser. No. 08/905,142, filed Aug. 1, 1997, which is now U.S. Pat. No. 5,981,874, issued Nov. 9, 1999; and this application is a continuation-in-part of application Ser. No. 08/905,077, filed Aug. 1, 1997, which is now U.S. Pat. No. 5,907,124, issued May 25, 1999; and this application is a continuation-in-part of application Ser. No. 08/862,380, filed May 23, 1997; and application Ser. No. 08/862,380 claims the priority of application Ser. No. 60/023,060, filed Aug. 2, 1996, and claims the priority of application Ser. No. 60/018,227, filed May 24, 1996; and each of which applications is incorporated is incorporated herein by reference.

FIELD OF THE INVENTION

This invention relates to a fixture mounting assembly and a junction box for installation in a wall, floor, or ceiling. In particular, the invention is directed to an electrical box particularly suited for use in concrete and the like.

BACKGROUND OF THE INVENTION

Junction boxes have long been used for making electrical connections in walls and ceilings. There have even been prior designs for placing an electrical outlet box in concrete, for example.

Conventional junction boxes, however, are typically unsuitable for carrying loads, for being cast directly in concrete, are costly to fabricate, and often have structural features which reduce the effectiveness and ease of use thereof.

For example, U.S. Pat. No. 2,983,399 to Slater et al. discloses an electrical outlet box having a seal for preventing concrete from entering the Slater box, yet the Slater outlet box is useable essentially only as a junction box, and is not designed for carrying heavy, vibrating loads, such as a ceiling fan.

U.S. Pat. No. Re. 34,603 to Caison et al. is of interest for its disclosure of an electrical junction box for support of a hanging appliance. The Caison et al. device discloses the use of square neck carriage bolts nonrotatably press fitted in the structure for carrying loads. However, loads are carried by the Caison et al. box itself, which hinders the ability of that box to carry relatively large and/or dynamic loads.

U.S. Pat. No. 1,824,708 to Davis et al. illustrates an electrical fixture and fan support which includes a bracket having a depression extending into the interior of the Davis et al. outlet box. The bracket is connected to the Davis et al. box as well as to an exterior header plate by stove bolts. Davis et al. states that a hanger bolt will be secured to the electrical fixture prior to its installation and then the worker will hoist it into position and slide the head of the hanger bolt into a head entrance and drop the hanger bolt down until it rests in a recess of the bracket. Although Davis et al. envisioned providing an extra pair of arms (Davis et al. FIG. 6) for carrying the added weight of a ceiling fan, the weight of a fixture, such a ceiling fan, will be transmitted through the single Davis et al. hanger bolt, and then through a number of screws. The reliability of the Davis et al. device is thus dependent on the individual and collective resistance to failure of a plurality of fasteners.

U.S. Pat. No. Re. 33,147 to Reiker is one of my earlier patents for a ceiling fan mounting assembly which works well and meets its intended purpose of resisting high loads and high torques. However, there is still a need for a junction box which is particularly suited for use in materials such as concrete.

OBJECTS AND SUMMARY OF THE INVENTION

Accordingly, it is an object of the invention to provide an electrical junction box which overcomes the drawbacks and disadvantages of the prior art devices.

Another object of the invention is to provide an electrical junction box which is particularly suited for use in walls, floors, and ceilings made of materials such as concrete.

Yet another object of the invention is to provide a junction box which can be inexpensively manufactured.

A still further object of the invention is to provide a junction box which is engineered so that large static and dynamic loads are transferred directly to the medium in which the junction box is installed, as opposed to the junction box itself.

A further object of the invention is to provide a junction box which has multiple spaces therein for accommodating different types of wires and cables concurrently.

A further object of the invention is to provide an electrical junction box which is more resistant to oxidation and rusting than earlier devices.

It is yet another object of the invention to provide a junction box which causes the strength of the substrate in which it is installed (such as a floor, wall, or ceiling) to be utilized for carrying the load of a fixture attached to the junction box.

A yet further object of the invention is to provide a junction box which is easier and faster to install and use than conventional boxes.

Another object of the invention is to provide a junction box providing an attachment site to which fixtures can be more readily attached than with conventional boxes.

Yet another object of the invention is to provide an electrical fixture mounting assembly having a junction box which prevents the introduction of concrete or water into the junction box cavity during installation thereof.

Another object of the invention is to provide a junction box in which additional space for communication lines is provided.

A further object of the invention is to provide an electrical fixture mounting assembly which carries the load of a fixture, and is retained in concrete without exerting forces applied by the fixture on an associated junction box.

Another object of the invention is to provide a bracket for retrofitting a conventional concrete junction box for eliminating the problem of forces applied by an associated mounted fixture being transferred to the junction box.

It is another object of the invention to take advantage of the properties of plastic and metal by having a substantially nonmetallic junction box, such as a plastic junction box, which may include fiberglass reinforced plastic (FRP) along with metal fastener attachment sites, such "marriage" of plastic and metal yielding a light-weight junction box which has increased carrying capacity, while being environmentally friendly owing to its reduced energy consumption during fabrication and during shipment from the producer to the end user.

Another object of the invention is to provide a plastic junction box which eliminates the need for zinc coating of conventional metallic junction boxes.

A still further object of the invention is to provide an electrical junction box which has a larger usable internal cavity than conventional junction boxes, even when the external volume required for the inventive junction box is the same as conventional junction boxes.

In summary, therefore, the invention is directed to an electrical fixture mounting assembly which is strong, easily and speedily used, and which overcomes the drawbacks of the prior art devices.

In another preferred embodiment of the invention a bracket extends outwardly of a junction box, and is configured for engaging concrete and transferring forces thereto. The bracket is configured for transferring forces from a mounted fixture substantially directly to the concrete in which it is installed.

In one preferred embodiment of the invention, the electrical fixture mounting assembly includes a junction box having a junction box cavity defined therein, and a mounting bracket disposed on the junction box. There is a fastener attachment site on the mounting bracket along with a fastener disposed thereon. The fastener is moveable between an extended position and a retracted position. The fastener is sufficiently long so that it extends outwardly of the junction box cavity when the fastener is in its extended position, and the fastener is contained substantially within the junction box cavity when the fastener is in its retracted position.

In another preferred embodiment of the invention, the electrical fixture mounting assembly includes a junction box having a junction box cavity defined therein, and a mounting bracket disposed on the junction box. There is a fastener attachment site on the mounting bracket along with a fastener disposed thereon. The fastener and the fastener attachment site are disposed so that a plastic coating on a plastic-coated wire is not abraded thereby in use.

In a preferred embodiment of a method according to the invention it is provided that when installing an electrical fixture mounting assembly in concrete, said method includes providing a junction box having a top, a bottom, a sidewall extending therebetween, and a junction box cavity therein. There is a further step of providing a mounting bracket having a fastener attachment site thereon, and providing a fastener disposed on said fastener attachment site, said fastener being movable between an extended position and a retracted position, said fastener being sufficiently long to extend outwardly of said junction box cavity when said fastener is in said extended position, and said fastener being contained substantially within said junction box cavity when said fastener is in said retracted position. A still further step includes placing said fastener in its retracted position and pouring concrete around said junction box.

BRIEF DESCRIPTION OF THE DRAWINGS

FIG. 6 is a side elevational view partially in section, of the preferred embodiment of the electrical fixture mounting assembly of FIG. 1, when in use;

FIG. 7 is an exploded perspective view of an extension box according to a preferred embodiment of my invention;

FIG. 8 is a perspective view of one of the side walls of the preferred embodiment of the extension box of FIG. 7;

FIG. 9 is a sectional view, similar to FIG. 6, of the preferred embodiment of the electrical fixture mounting assembly of FIG. 1, when in use with the auxiliary box of FIG. 7;

FIG. 10 is a sectional view of a PRIOR ART electrical box for installation in concrete, shown in use;

FIG. 12 is a perspective view of a clip which may be used with the preferred embodiment of the electrical fixture mounting assembly of FIG. 11;

FIG. 13a is a partially sectioned elevational view of a still further preferred embodiment of an electrical fixture mounting assembly according to the invention;

FIG. 13b is a partially sectioned elevational view of a yet still further preferred embodiment of an electrical fixture mounting assembly according to the invention;

FIG. 14 is a partially sectioned elevational view of a further preferred embodiment of an electrical fixture mounting assembly according to the invention;

FIG. 16b is a perspective view of a bracket for use with the preferred embodiment of FIG. 16a;

FIG. 18a is a partially sectioned view of a further preferred embodiment of an electrical fixture mounting assembly according to the invention;

FIG. 18b is a perspective view of a bracket for use with the preferred embodiment of FIG. 18a;

FIG. 19b is an exploded, perspective view of two halves of the preferred embodiment of the electrical fixture mounting assembly of FIG. 19a;

FIG. 21 is an exploded, perspective view of a further preferred embodiment of an electrical fixture mounting assembly;

FIG. 21a is a perspective view of another preferred embodiment of a mounting bracket according to the invention;

FIG. 21b is an exploded, perspective view of a further embodiment of a fixture fastening site according to the invention;

FIG. 21c is a further preferred embodiment of a fixture fastening site according to the invention;

FIG. 23 is an exploded, perspective view of a still further preferred embodiment of an electrical fixture mounting assembly according to the invention;

FIG. 23a illustrates a combination fixture fastening site and fixture alignment member of FIG. 23, on an enlarged scale;

FIG. 24 is a perspective view of another combination fixture fastening site or fastener attachment site or fixture alignment member according to the invention;

FIG. 24a is a cross-sectional view of a portion of FIG. 24;

FIG. 25 is an exploded, perspective view of yet another preferred embodiment of an electrical fixture mounting assembly according to the invention;

FIG. 26 is a perspective view of another preferred embodiment of an electrical fixture mounting assembly according to the invention;

FIG. 26a illustrates a combination fixture mounting site or fastener attachment site or fixture alignment member of FIG. 26, on an enlarged scale;

FIG. 26b illustrates a combination fixture mounting site or fastener attachment site or fixture alignment member of FIG. 26, on an enlarged scale;

FIG. 26c illustrates another preferred embodiment of a combination fixture attachment site or fastener attachment site or fixture alignment member according to the invention, similar to FIG. 26b;

FIG. 27 is an exploded, perspective view of yet another preferred embodiment of an electrical fixture mounting assembly according to the invention;

FIG. 28 is an exploded, perspective view of another preferred embodiment of an electrical fixture mounting assembly according to the invention;

FIG. 28a illustrates a combination fixture mounting site or fastener attachment site or fixture alignment member of the embodiments of FIGS. 27 and 28, on an enlarged scale;

FIGS. 28b–28d illustrates additional preferred embodiments of elements of the invention, similar to FIG. 28a;

FIG. 31 is a perspective view of a yet still preferred embodiment of an electrical fixture mounting assembly according to the invention;

FIG. 32 illustrates another preferred embodiment of an electrical fixture mounting assembly according to the invention;

FIG. 33 is a perspective view of a still further preferred embodiment of an electrical fixture mounting assembly according to the invention;

FIG. 33a is a perspective view of a combination fastener attachment site or fasterner attachment site or fixture alignment member of FIG. 33;

FIG. 36 is a perspective view of another preferred embodiment of an electrical fixture mounting assembly according to the invention;

FIG. 36a is an exploded, perspective view of another preferred embodiment of a lid, with its associated gaskets;

FIG. 37 is a perspective view of a preferred embodiment of an electrical fixture mounting assembly according to the invention;

FIG. 37a is a perspective view of an element of FIG. 37;

DETAILED DESCRIPTION OF THE INVENTION

Figure 1:
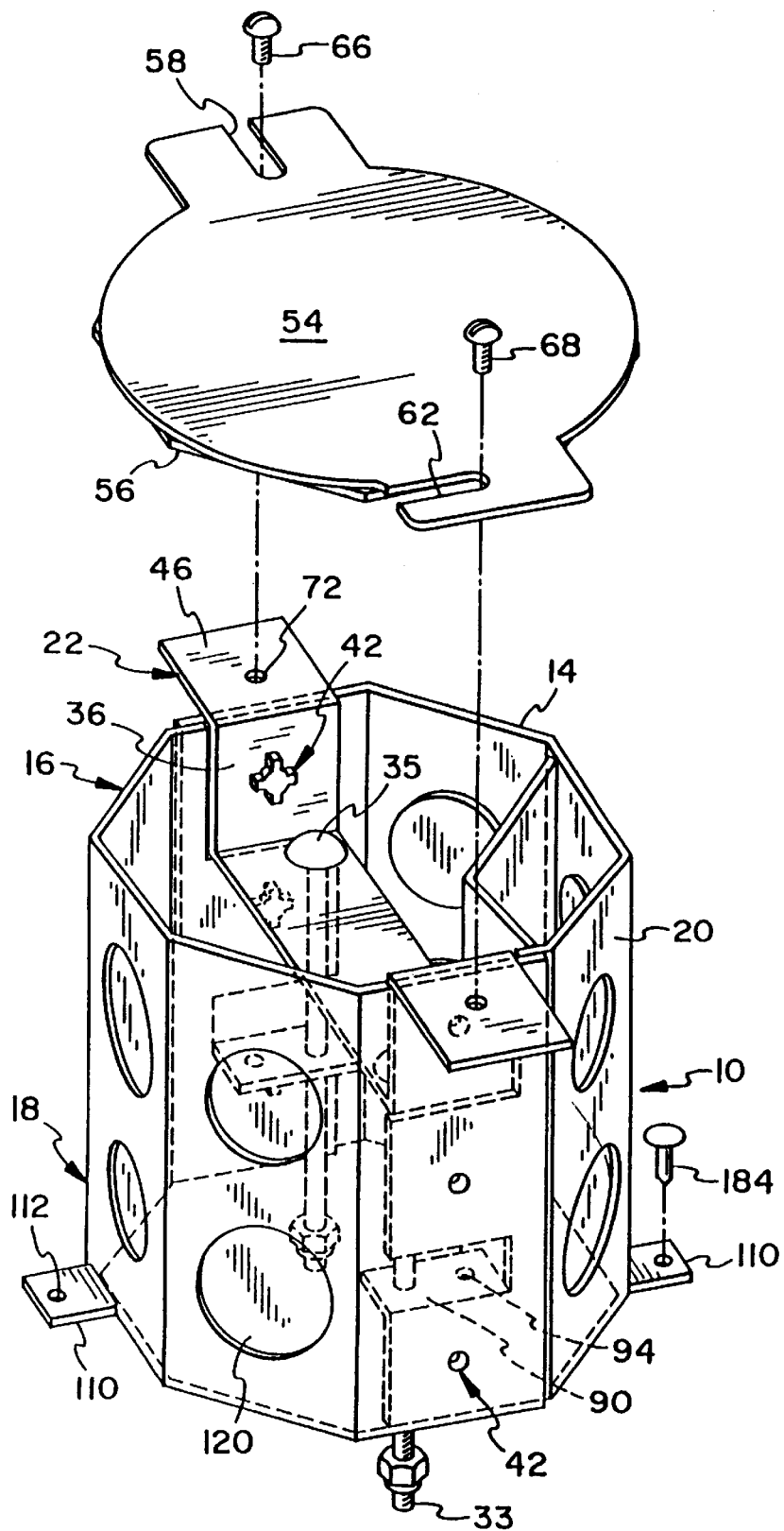
FIG. 1 is an exploded perspective view of a first preferred embodiment of an electrical fixture mounting assembly according to the invention.

FIGS. 1–6 illustrate a first preferred embodiment of an electrical fixture mounting assembly 10 having a junction box 14, according to a first preferred embodiment of the invention.

Junction box 14 includes a top 16 and a bottom 18.

The terms "electrical fixture mounting assembly", "junction box", "top" and "bottom", as well as other relative terms used throughout the specification, are for convenience only and are not intended to be limiting.

Junction box 14 includes a side wall 20 and defines a junction cavity 21. Junction box cavity 21 is sized for receiving and joining electrical wires, conduit, cable connections, fiberoptics, and other telecommunication linkages, as will be described in greater detail below.

A mounting bracket 22 is disposed adjacent the top of junction box 14 and is disposed and configured for transferring the weight and vibration of electrical fixtures, for example, directly to the substrate in which electrical fixture mounting assembly 10 is disposed, as opposed to transferring the weight of mounted fixtures to junction box 14, as is often the case in prior art devices.

A fastener attachment site 26 is provided on a transverse support 30 of mounting bracket 22.

A first vertical extension 36 and a second vertical extension 38 are preferably provided as part of mounting bracket 22. Vertical extensions 36 and 38 are sized to provide a space or upper subcavity 40 in a volume substantially defined by transverse support 30 and the top 16 of junction box 14.

Good results have been achieved when a weld-free stamped or punched connector 42 joins sidewall 20 to mounting bracket 26. The punched connector 42 provides a secure attachment between components of electrical fixture mounting assembly 10, without disturbing a galvanized coating on the assembly in the case where galvanized sheet metal is used, for example, and without the need for a separate fastener. An oxidation-resistant, rustfree connection is achieved, which is desirable when junction box 14 is cast in concrete, for example, where water moisture may induce rust at unprotected sites.

At least one extension 46, which may extend outwardly from vertical extension 36 of mounting bracket 22 and outwardly of junction box 14, is typically provided. A second extension 48 may likewise be provided.

A lid 54 is configured for mating with top 16 of junction box 14. A foam gasket 56, which may be made of any suitable water-resistant or water-proof material, is provided on a lower side of lid 54 for establishing a seal between lid 54 and sidewall 20 for preventing the introduction of liquid and material into junction box cavity 21, when in use. Foam gasket 56 may be given an octagonal configuration for mating with the octagonal upper open end of junction box 14.

A slot 58 is defined in an outwardly extending tab 60 of lid 54. A further slot 62 is provided in another tab 64, and slot 62 may be provided extending at an angle relative to slot 58 so as to enhance the connection between a fastener 66 and a fastener 68, respectively. A like pair of female connectors 72 and 76, such as threaded holes, are provided in extensions 46 and 48, respectively, of mounting bracket 22.

An inwardly extending auxiliary bracket 90 is provided with a throughhole 92 and a threaded bore 94. A securing tab 96 extending from an inner wall 98 defining a subcavity 100 is attached to auxiliary bracket 90 by use of a fastener 97. Subcavity 100 can be sized for housing communication lines in a portion of junction box cavity 21 separate from the main volume thereof.

A temporary tie down tab 110 having a bore 112 extending therethrough is provided extending outwardly from sidewall 20. Two or more such temporary tie down tabs 110 may be provided.

Conveniently, a ground wire 116 suited for use with electrical devices and hook-ups can be secured to one of auxiliary brackets 90.

A plurality of knock-outs 120 are preferably provided in sidewall 20 as partially cut through bores which are readily removed for receiving conduits and electrical wires, for example, as is well known.

A plurality of subpanels 124, 125, 126, 127, and 128 has been successfully made to collectively define sidewall 20. Two such sidewall halves 118 are secured together by stamped connectors 42. For example, as can be readily appreciated from considering FIGS. 1, 2, and 4 in particular, the respective subpanels 124 of a pair of sidewall halves 118 will be disposed outwardly of a respective pair of subpanels 128 and attached thereto. It is contemplated that the paired sidewall halves be made substantially identical.

FIG. 6 illustrates electrical fixture mounting assembly 10 as it is being cast in concrete, for example. The manner in which fixture mounting assembly 10 is secured in such a medium or substrate will be described in greater detail under OPERATION below.

Turning to FIGS. 7–9, auxiliary junction box 150 will be explained.

Auxiliary junction box 150 includes a sidewall 152 and a cover 154. A plurality of knock-outs 153 is provided in any desired manner, depending on the intended use of auxiliary junction box 150. A pair of apertures 160 and 162 extend through cover 154 and are configured for allowing fasteners 163 to extend therethrough and engage with respective ones of threaded bores 164 tapped (or otherwise formed) in inwardly extending tabs 168.

A pair of sidewall halves 170 has successfully been used to form sidewall 152 of auxiliary junction box 150. When constructing auxiliary junction box 150, respective ones of a pair of subpanels 171 are disposed outwardly of a pair of spaced opposed subpanels 172. One or more fasteners 173 join the two sets of paired panels 171 and 172 together.

A fastener guide 174 extends inwardly into the cavity of auxiliary junction box 150. A throughhole 175 and/or a threaded bore 176 is provided so that auxiliary junction box 150 can be detachably attached below junction box 14 as shown in FIG. 9.

Good results have been achieved when fastener guide 174 is positioned on sidewall 170 so that bolt 33 of the length or configuration which can be disposed entirely within junction box cavity 21 of junction box 14 can be used for securing auxiliary junction box 150 to junction box 14. It is likewise contemplated that other dispositions of fastener guide 174 and/or lengths and sizes of bolts 33 will be used.

FIG. 10 illustrates a PRIOR ART concrete box 200 over which the various embodiments of the electrical fixture mounting assembly according to the invention have improved. PRIOR ART box 200 typically includes an inner tab 204 and an outer tab or temporary tie down tab 208. One or more fixture fasteners 212 extend through inner tabs 204 and support an unillustrated fixture. In use, the PRIOR ART concrete box 200 would typically be installed in a substrate S such as concrete. An exterior wall 220 of PRIOR ART box 200 would be surrounded by substrate S and would be at least partially adhered thereto. Thus, when a fixture was attached to box 200 by fasteners 212, forces F1 and F2 exerted by the fixture were exerted on inner tabs 204 and, hence, the remainder of PRIOR ART box 200. It will be appreciated that the adhesion between exterior wall 220 and substrate S, and any frictional resistance developed therebetween, would have provided substantially the only resistance to PRIOR ART box 200 being pulled out of substrate S by forces F1 and F2 exerted by the fixture. The installation of PRIOR ART concrete box 200 is shown in FIG. 10 when box 200 is used in a ceiling C.

Figure 11:
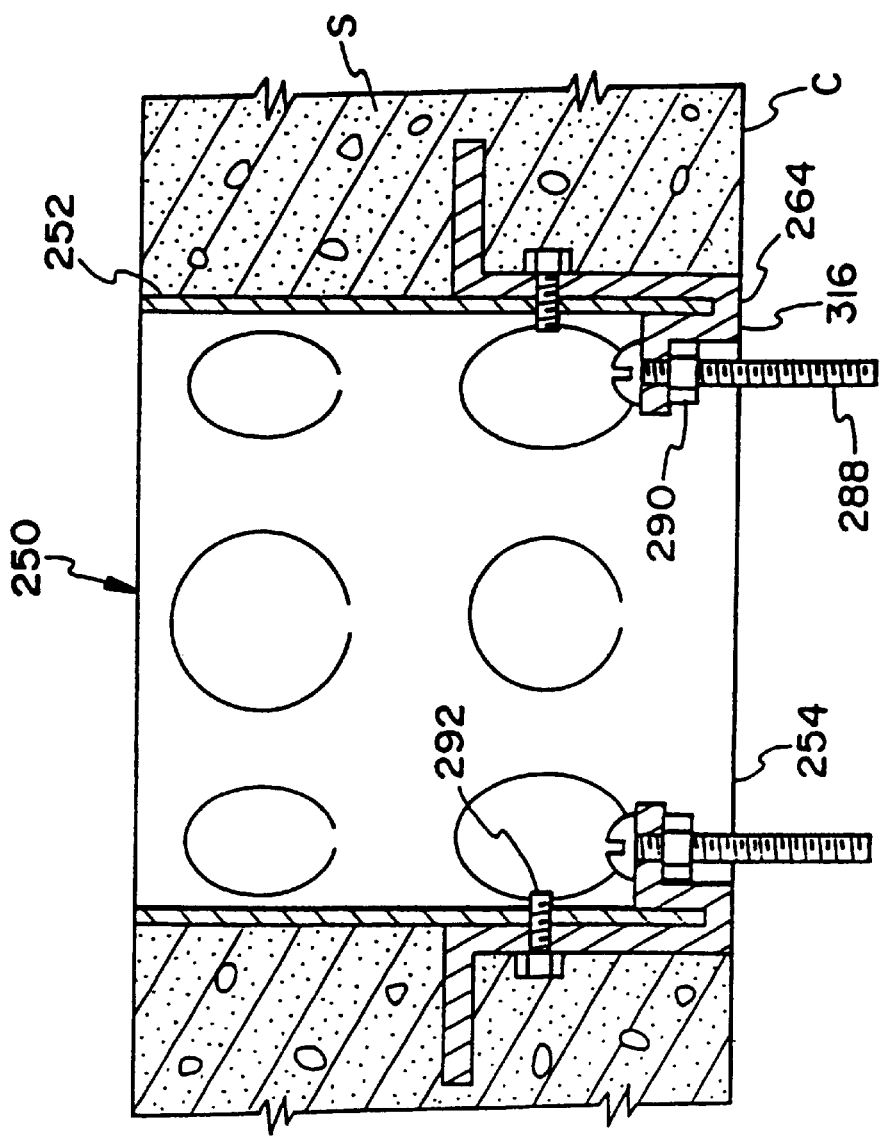
FIG. 11 is a sectional view of a further preferred embodiment of an electrical fixture mounting assembly according to the invention.

Turning to FIGS. 11 and 12, a further preferred embodiment of an electrical fixture mounting assembly 250 according to the invention is shown, along with a clip 260 for use with the assembly 250 of FIG. 11. It is likewise contemplated that clip 260 can serve to retrofit a PRIOR ART box 200 of FIG. 10. Electrical fixture mounting assembly 250 includes an outer wall 252 and a lower edge 254.

Clip 260 includes a base 264, an outer wall 268, and an inner wall 272. An outer extension 276 extends from outer wall 268. Preferably, an inner extension 280 is provided that extends from inner wall 272. A hole 284 may be pre-formed in inner extension 280 for receiving a fixture fastener 288. Conveniently, a lock nut 290 is provided on fixture fastener 288 for preventing rotation thereof when a fixture is being attached to fixture fasteners 288. An optional clip fastener 292 extends through an optional hole 296 provided in outer wall 268 for securing clip 260 to outer wall 252 of assembly 250.

It is likewise contemplated that a gap 302 defined between inner wall 272 and outer wall 268 of bracket 260 will be sized to correspond to the thickness of outer wall 252 of assembly 250 so as to provide frictional engagement therebetween. The width of gap 302 may likewise be sized for engaging exterior wall 220 of PRIOR ART concrete box 200. When clip 260 is used to retrofit a PRIOR ART concrete box 200, it will be appreciated that box will be elevated by an amount equal to a base thickness 308 of clip 260. When PRIOR ART box 200 is retrofitted with clip 260, a gap between the bottom of box 200 and the supporting member (i.e., the concrete form work such as plywood P shown in FIG. 6) is formed. Depending on the viscosity of the concrete and the size of the gap resulting from base thickness 308, additional steps may need to be taken to prevent entry of concrete into the interior of retrofitted box 200.

The preferred embodiment of FIG. 11 overcomes any potential problems resulting from the base thickness 308. A portion of outer wall 252 of electrical fixture mounting assembly 250 has been removed to compensate for base thickness 308. Thus, it will be appreciated that a cut out can be formed in the lower portion of outer wall 252 that has a width sufficiently large to receive the width 312 of bracket 260, as well as sufficiently tall to accommodate the base thickness 308. In that manner, a bottom face 316 of base 264 will be flush with lower edge 254 of electrical fixture mounting assembly 250. Hence, lower edge 254 and bottom face 316 are aligned, are seated evenly on supporting concrete form work when in use, and are aligned with the surface of ceiling C when installed, as seen in FIG. 11.

FIGS. 13A and 13B illustrates a further preferred embodiment of an electrical fixture mounting assembly 350 according to the invention.

Assembly 350 includes a sidewall 354 defining a junction box cavity 356. A fixture fastener 358 extends below junction box cavity 356 for having a fixture attached thereto. As will be readily appreciated a lock nut or other locking means 362 can be used to clamp fixture fasteners 358 relative to wall 354, so that a fixture can be readily attached when electrical fixture mounting assembly 350 is embedded and retained in a substrate, such as concrete. One or more flanges 366 extend outwardly of wall 354. Flanges 366 transfer forces exerted on walls 354 by fixture fastener 358 to the surrounding concrete S, a portion of which is illustrated. It is contemplated that assembly 350 be made of plastic, and fixture fasteners 358 be made of metal, for example.

FIG. 13b illustrates a still further preferred embodiment of an electrical fixture mounting assembly 367 according to the invention. Assembly 367 is similar to the embodiment of FIG. 13a, and incldues a fastener 368 having a head 369, and which fastener 368 can be completely contained within the confines of assembly 367 during installation thereof.

A flange 370 is configured for transferring forces to surrounding concrete S, and a metal insert 371 is provided to further strengthen assembly 367, which may be made of various types of plastic and fiberglass reinforced plastics (FRP). A chamber 372a is defined, in part, by an upright extension 373a which may be integral with wall 374. Wall 374 and extension 373a define a junction box cavity J. A lower chamber 372b for receiving lock nut 362 and the free end of fastener 368, for example, is defined in a similar manner by an extension 373b. When fasteners 368 are made of metal, chambers 372a and 372b are preferably made of plastic to satisfy current electrical code requirements for segregating metal fasteners from junction box cavity J.

Turning to FIG. 14, a further preferred embodiment of an electrical fixture mounting assembly 375 according to the invention is shown.

Assembly 375 includes a wall 378 and one or more extensions 382 extending outwardly therefrom. A lid 386 is provided.

One or more optional fasteners 390 can be used to secure lid 386 to extension 382. One or more fixture fasteners 394 extend through lid 386 and are retained thereby, such as by engagement of a fastener head 396 with lid 386. Fasteners 394 extend past the bottom of wall 378 for engaging and supporting a fixture attached thereto, in a manner similar to the other preferred embodiments. A lock nut, lock washer and nut combination, and the like 398 is preferably used to fix fastener 394 relative to lid 386. By restricting movement of fastener 394, the attachment of a fixture at free ends 402 of fasteners 394 is made easier.

Figure 15:
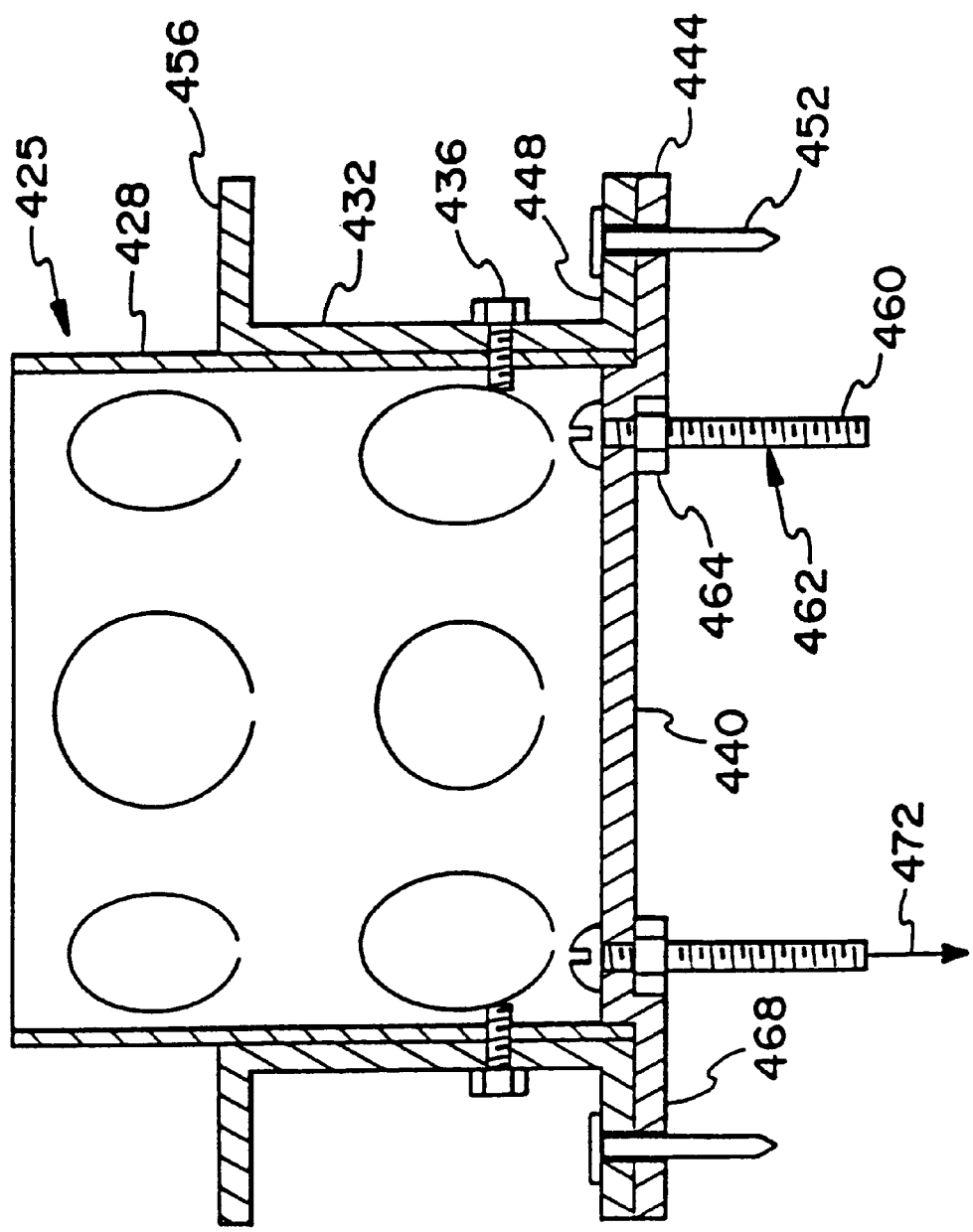
FIG. 15 is a partially sectioned elevational view of a still further preferred embodiment of an electrical fixture mounting assembly according to the invention.

Turning to FIG. 15, another preferred embodiment of an electrical fixture mounting assembly 425 according the invention is shown.

Assembly 425 includes a wall 428 defining a junction box cavity therein. A bracket 432 configured for engaging concrete is disposed adjacent wall 428. Preferably, bracket 432 is attached to wall 428, such as by a fastener 436. A fixture support bracket 440 having a lip or extension 444 is preferably disposed adjacent concrete bracket 432. A lower extension 448 on bracket 432 is conveniently provided with an aperture aligned with a corresponding aperture in extension 444, and through both of which a fastener 452 can be inserted for temporarily attaching electrical fixture mounting assembly 425 to concrete form work, for example.

An upper lip or extension 456 is provided on concrete bracket 432. Preferably, lip 456 extends transversely outwardly of wall 428 and is configured for engaging concrete when in use, lip 456 being configured for preventing removal of the junction box (i.e. entire electrical fixture mounting assembly 425) from the concrete when in use.

As will be appreciated, extension 456 will be configured and sized for engaging a sufficient amount of concrete to prevent movement of the junction box in the direction of the outward extension of a free end 460 of a fixture fastener 462. For example, when electrical fixture mounting assembly 425 is installed in a concrete ceiling, a lower face 468 of fixture support bracket 440 will be substantially aligned with the ceiling, and free end 460 will extend outwardly of the ceiling and of the assembly 425 into the associated room so that a fixture can be attached thereto. When electrical fixture mounting assembly 425 is mounted in a concrete ceiling, a force 472 exerted by such a fixture will be exerted on fasteners 462. The configuration and size of extension 456 will be one of the elements of electrical fixture mounting assembly 425 which counteracts force 472 and prevents force 472 from pulling assembly 425 out of the ceiling.

Conveniently, extension 456 is spaced from lower extensions 448 at a distance selected to allow for the user to readily access fastener 452 during installation. For example, in the case where fastener 452 is a standard nail, extension 456 will be sized and spaced appropriately from extension 448 to allow the use of a hammer to install fastener 452.

A lock nut 464 may be provided for preventing rotation of fastener 462 relative to fixture support bracket 440, to ease installation of a fixture as in the other preferred embodiments of the invention.

It is expected that concrete-engaging bracket 432 and fixture support bracket 440 will be made as an integral part, and will be fixedly or detachably attached to wall 428, depending on the intended use.

It will likewise be appreciated that the lower portion of wall 428 can be notched (i.e., a portion removed therefrom) for receiving fixture support bracket 440 so that the lower edges of wall 428 are substantially co-planar with lower face 468 so that both those surfaces engage concrete form work, when in use.

Figure 16A:
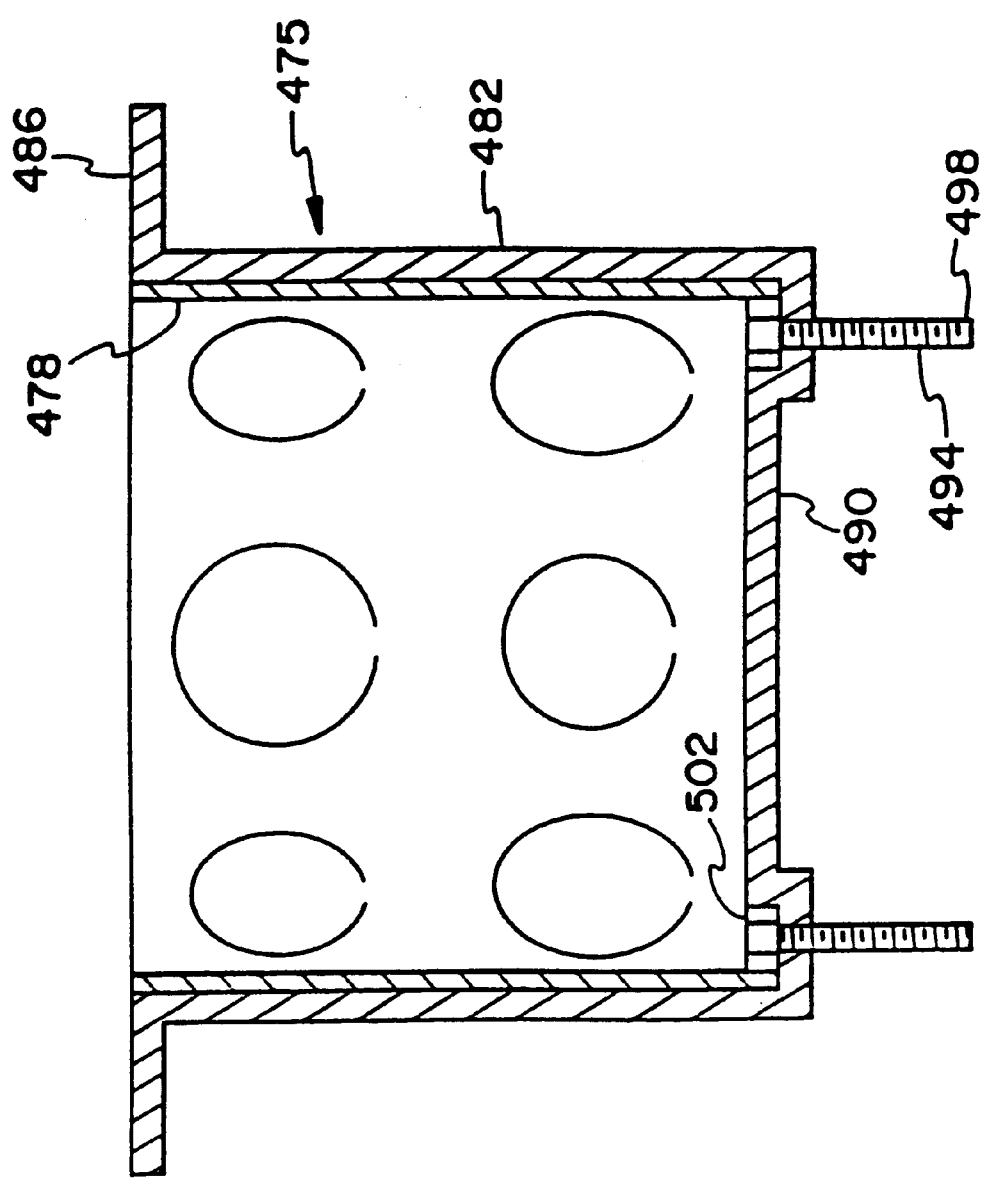
FIG. 16a is a partially sectioned elevational view of yet another preferred embodiment of an electrical fixture mounting assembly according to the invention.

FIGS. 16a and 16b illustrate another preferred embodiment of an electrical fixture mounting assembly 475 according to the invention.

Assembly 475 includes a wall 478 defining a junction box cavity therein. A unitary bracket 482 functions as both a concrete engaging element and a fixture supporting element. Bracket 482 includes a concrete engaging lip or extension 486 and a base 490. A fixture fastener 494 extends through base 490.

In use, a free end 498 of fastener 494 extends outwardly of the junction box. Preferably, a head portion 502 of fastener 494 engages a portion of base 490 for resisting rotation, when in use supporting a fixture. Alternatively, a lock nut can be used adjacent base 490 for preventing rotation, in a manner similar to the embodiment of FIG. 11, for example.

As illustrated, bracket 482 can be used with a conventional junction box. Conveniently, a lower portion of wall 478 can be removed for receiving bracket 482, as in the embodiment of FIG. 11, for example. Thus, a lower portion of wall 478 corresponding in height to thickness 506 of bracket 482, and having a width corresponding to a width 510 of bracket 482 will be removed from corresponding areas so that the remainder of wall 478 engages concrete form work when electrical fixture mounting assembly 475 is being installed.

Figure 17:
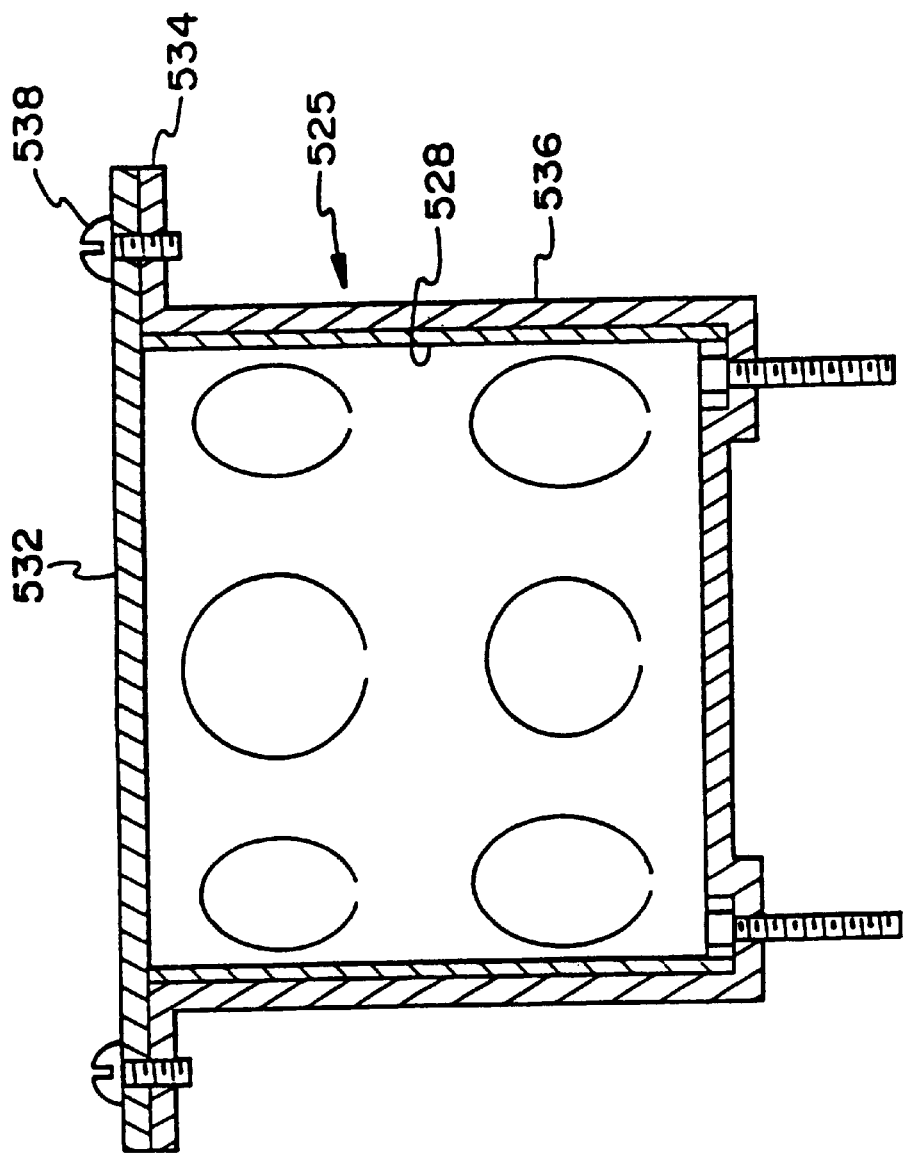
FIG. 17 is a partially sectioned elevational view of another preferred embodiment of an electrical fixture mounting assembly according to the invention.

Turning to FIG. 17, another preferred embodiment of an electrical fixture mounting assembly 525 according to the invention is shown. Mounting assembly 525 includes a wall 528 defining a junction box cavity therein.

This preferred embodiment is similar to the preferred embodiment of FIGS. 16a–16b, and includes a lid 532 which preferably encloses the junction box cavity. Lid 532 may be attached to a lip or extension 534 formed on a bracket 536 which may be secured to lid 532 by one or more fasteners 538. Bracket 536 may be substantially the same as bracket 482 of FIG. 16b, or may be configured to surround a lesser or greater relative portion of wall 528.

FIGS. 18a–18b illustrate a yet further preferred embodiment of an electrical fixture mounting assembly 550 according to the invention.

Assembly 550 is similar to the preferred embodiments of FIGS. 16a–17. Assembly 550 includes a wall 554 defining a junction box cavity therein. A bracket 558 includes a concrete engaging lip or extension 562 bracket 558 defines a lower fixture supporting base portion 564, similar to the embodiments of FIGS. 16a–17.

Preferably, a lid 566 engages an upper portion of wall 554 and covers the upper opening of the junction box. Lips 568 extend outwardly of lid 566 and retain lid 566 relative to walls 554. As in the earlier embodiments, it is contemplated that bracket 558 will be pressure fitted into engagement with wall 554 and/or attached thereto by fasteners, such as rivets.

Figure 19A:
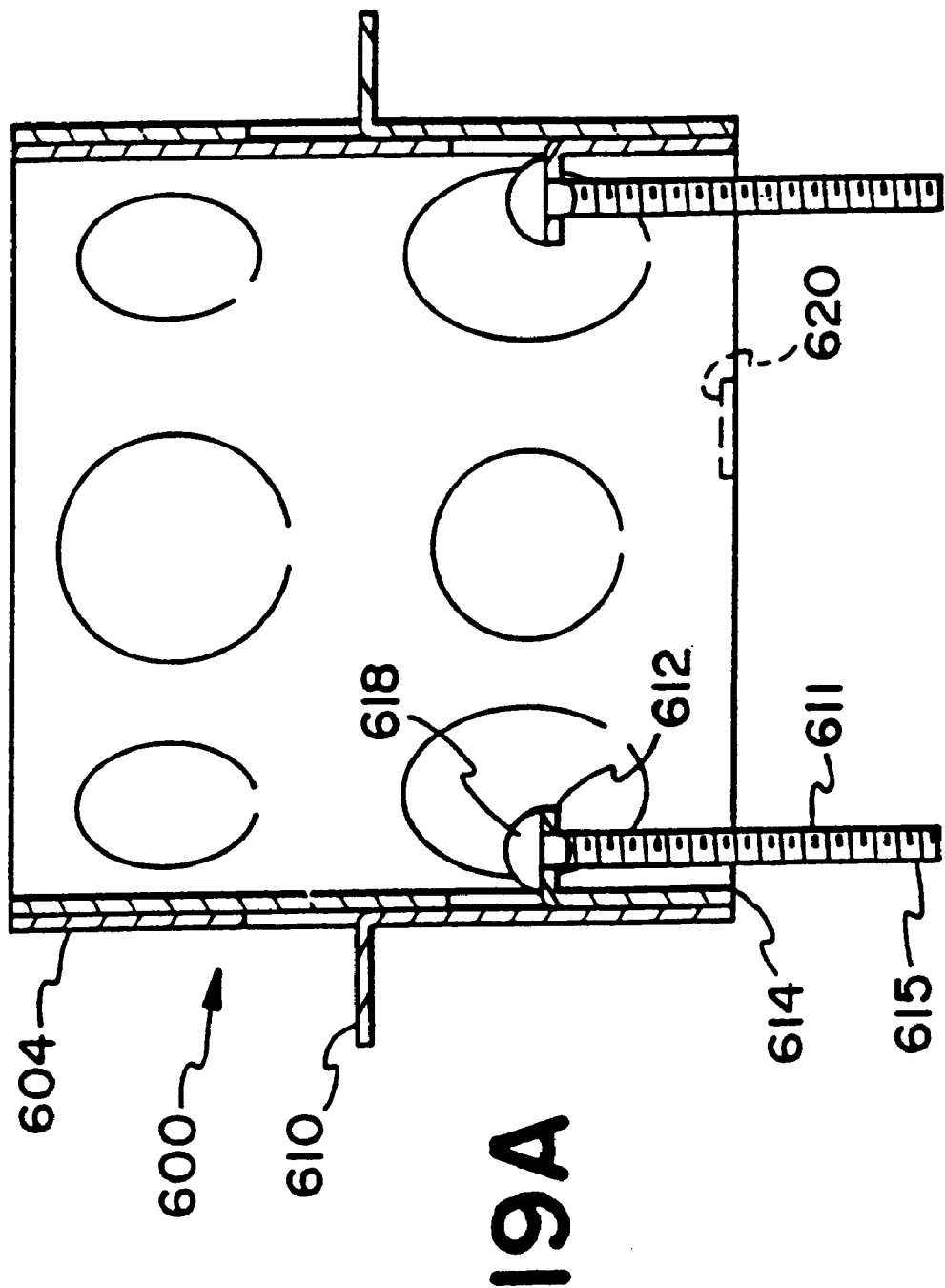
FIG. 19a is a partially sectioned elevational view of a yet still further preferred embodiment of an electrical fixture mounting assembly according to the invention.

Turning to FIGS. 19a–19b, a further preferred embodiment of an electrical fixture mounting assembly 600 according to the invention is illustrated. Fixture mounting assembly 600 includes a wall 604. Conveniently, wall 604 may be made of a first half 606 and a second half 608. As will be readily appreciated from viewing FIG. 19b, first half 606 is conveniently made substantially identical to second half 608. A concrete engaging tab 610 extends outwardly from wall 604. Concrete engaging tab 610 is configured and sized for engaging a sufficient amount of concrete, when installed, for resisting forces applied on fasteners 611 by attached fixtures, when in use, as in the other preferred embodiments. Fasteners 611 are supported by fastener engaging extension 612. Extensions 612 are preferably spaced from a lower edge 614 of mounting assembly 600 so that fastener 611 can be retained within the enclosed volume of the junction box during installation (i.e., by having free end 615 of fastener 611 disposed between lower edge 614 and fastener engaging extension 612 during installation).

As in the preferred embodiment of FIG. 1, it is contemplated that holes 616 in fastener engaging extension 612 be configured for engaging fastener 611 when fasteners 611 are extended outwardly of the junction box, when in use, so as to prevent rotation of fastener 611 and ease attachment of a fixture to fastener 611. For example, when fasteners 611 are carriage bolts having a square neck portion adjacent heads 618 thereof, holes 616 will be configured as mating squares for preventing rotation thereof.

Preferably, second half 608 of wall 604 includes a first face 624 and an opposed face 628. First half 606 includes a first face 632 and an opposed face 636. When assembled, face 632 overlaps face 624 and, in a like fashion, face 628 overlaps face 636. Fixture mounting assembly 600 is strengthened thereby and, in addition, as illustrated, the solid portion of face 624 overlaps the cutout in face 632 from which extension 610 was formed. Likewise, a solid portion of wall 606 overlaps the cutout portion from which extension 612 in face 624 is formed. Thus, the assembled electrical fixture mounting assembly 600 has no holes into which concrete would enter the junction box when being installed.

Figure 20:
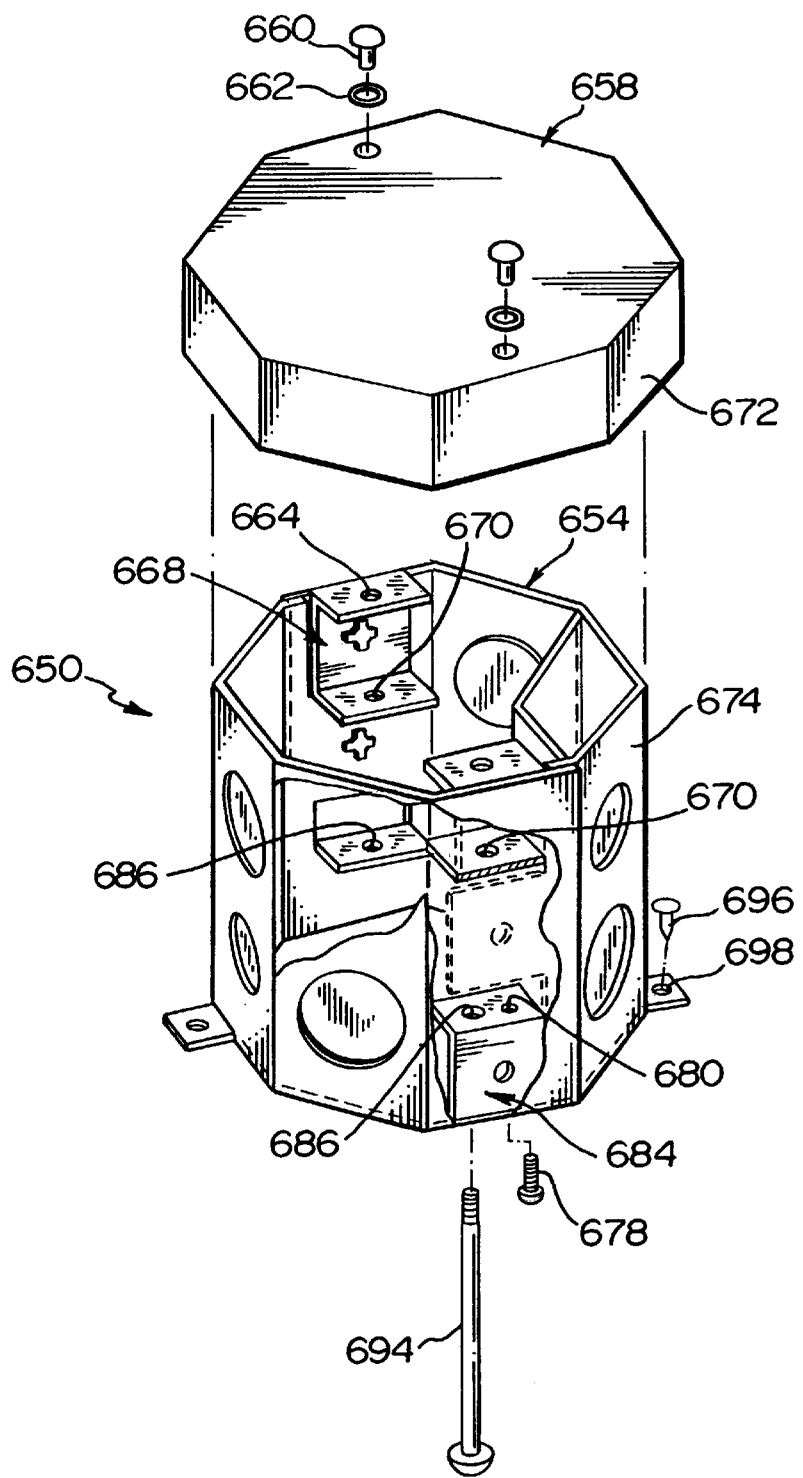
FIG. 20 is an exploded, perspective view of another preferred embodiment of an electrical fixture mounting assembly according to the invention.

FIG. 20 illustrates an electrical fixture mounting system 650 including a junction box 654 and a lid 658.

Lid 658 may be made of plastic such as fiberglass reinforced plastic (FRP). Lid 658 may be attached to junction box 654 by use of a screw 660, an optional gasket or lock washer 662, and screw 660 being readily received in threaded hole 664. Threaded hole 664 may be provided in a C-shaped mounting bracket 668 having another hole 670 therein.

Lid 658 may include a sidewall 672 which is disposed outwardly of a corresponding junction box sidewall 674 when lid 658 is attached to box 654, in use. In that manner, the collective thicknesses of sidewall 672 extending outwardly of box sidewall 674 serves to keep box 654 from being pulled out of the substrate (e.g., concrete) in which it is installed, during use.

A ground screw 678 may be provided for grounding an installed electrical wire by attaching such wire to a hole 680 defined in fastener alignment member or bracket 684. A further hole 686 provided in bracket 684 may be a through hole substantially aligned with hole 670. Hole 670 will be threaded in the case where a fixture fastener 694 is not a self-tapping fastener.

It is contemplated that hole 686 will be free of threads, functioning as part of the fastener alignment member when fastener 694 is threadedly secured in hole 670 and supported by bracket 668. The two vertically spaced apart holes 670 and 686 cooperate to virtually eliminate undesirable movement of fastener 694 when fastener 694 is in use supporting a fixture, such as a light fixture, and especially in the case where the fixture is a ceiling fan which exerts both static and dynamic forces on junction box 654.

It will be appreciated that the spacing between holes 670 and 686 may be varied depending on the intended use, as well as which holes are threaded, the thickness of the material, and other parameters.

As described above, a fastener 696 may be inserted through a hole 698 for securing junction box 654 during the casting of the concrete.

FIG. 21 shows a fixture mounting assembly 700 including a junction box 702 and a corresponding lid 704.

Box 702 includes outwardly extending mounting bracket 706 which cooperate with counterpart extension 708 on lid 704 for securing junction box 702 against being "pulled out" of the concrete during use.

Junction box 702 includes an inner extension 709 having a hole 710 therein for receiving fastener 694. Preferably, a lower hole 716, which may be an unthreaded through hole, is substantially aligned with upper hole 710 so that holes 710 and 716 cooperate in securing fastener 694 against movement. A bracket 714 may be riveted or mechanically punched out for securement thereof to the sidewall of junction box 702, as discussed above in connection with previous embodiments.

Preferably, a threaded hole 718 is provided on bracket 714 for receiving grounding screw 678.

FIG. 21a shows a combination mounting bracket and fixture attachment site 717 which is essentially a combination of brackets 706 and 709.

FIG. 21b shows another embodiment of bracket or fastener attachment site 710 in which a ground screw hole 718 has been provided for receiving ground screw 678.

FIG. 21c shows another embodiment of a fastener attachment site 720 in which a further threaded hole 722 has been provided in addition to holes 710 and 718. Hole 722 is preferably sized for receiving a fastener 724 of a type which differs from fastener 694. Thus, fastener 724 can be sized for securing standard light fixtures, which typically have 8-32 threads, while fastener 694 is provided with 10-32 threads, which fasteners are commonly used for securing ceiling fans.

Figure 21D:
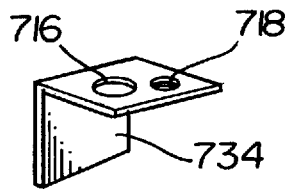
FIGS. 21d–21g illustrate still further preferred embodiments of fixture attachment sites or fixture alignment members according to the invention.

FIG. 21d shows another fastener alignment bracket or lower bracket 734 provided with through hole 716 and ground screw hole 718.

Figure 21E:
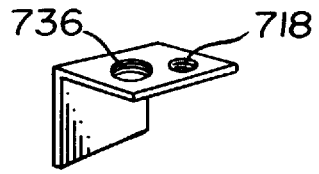

FIG. 21e illustrates another fastener alignment bracket having a threaded hole 736, which may be used for securing fasteners having threads substantially along the entire length thereof, or for fixture fasteners shorter than those required for mounting to top brackets 709 as shown in the embodiment of FIG. 21.

Figure 21F:
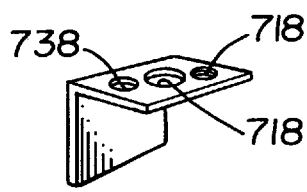

FIG. 21f illustrates another fastener alignment member/lower bracket having a further through hole 738 therein for allowing a fastener, such as fastener 724 to pass therethrough when the FIG. 21f bracket is used with the FIG. 21 bracket disposed thereabove.

Figure 21G:
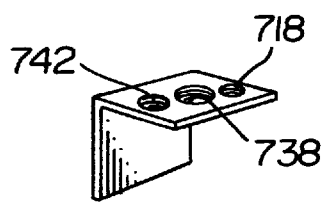

FIG. 21g shows another preferred embodiment of a lower bracket which has a threaded hole 742 corresponding to the threads of fastener 724, for example, and threaded hole 736 having threads corresponding to those of fasteners 694. In that manner, this FIG. 21g bracket may be used for securing two different types of fasteners, and supporting the associated fixtures, depending on the use thereof.

Figure 22:
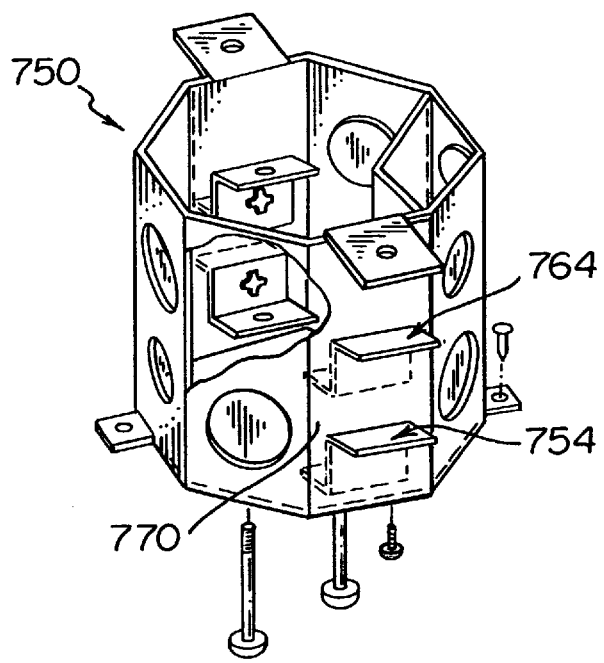
FIG. 22 is a perspective view of yet another preferred embodiment of an electrical fixture mounting assembly according to the invention.
Figure 22A:
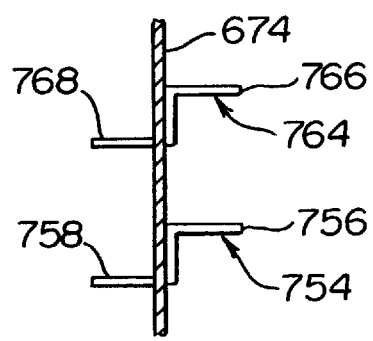
FIG. 22a is a partial view of a portion of FIG. 22 on an enlarged scale.

FIGS. 22 and 22a illustrate another preferred embodiment of an electrical fixture mounting system 750 according to the invention.

Assembly 750 include the feature that an integral fastener alignment member/lower bracket 754 is provided that includes an outwardly extending extension 756 and an inwardly extending extension 758. There may likewise be provided a fastener attachment site or upper bracket 764 having an outwardly extending extension 766 and an inwardly extending extension 768.

As will be appreciated, both brackets 764 and 766 may extend through a wall 770 of the junction box.

Each of brackets 754 and 764 provides additional concrete support; i.e., additional support for preventing removal of the box from the concrete in which it is cast, as discussed above.

As will be appreciated, any of the various combinations of threaded and unthreaded holes, one, two, and three holes per bracket, may be provided as described above.

FIGS. 23 and 23a illustrate an electrical fixture mounting assembly 775 which includes a combination fastener attachment site/ fastener alignment member or bracket 780. Bracket 780 includes a lower hole 782 and an upper hole 783.

There may likewise be provided a threaded hole 784 for securing a grounding wire 785 for use of a ground screw 786.

Typically, in use, a fixture fastener 788 passes through unthreaded hole 782 and is threadedly secured to hole 783. The box-like structure of bracket 780 is relatively rigid and affords a more compact structure than some of the above embodiments in which fastener alignment holes and fastener attachment holes were relatively widely spaced apart as compared to this embodiment, depending on the offsets and materials used.

FIGS. 24 and 24a illustrate another preferred embodiment of a mounting bracket 790, similar to mounting bracket 780, with the additional feature that a dimpled fastener hole 792 having an upwardly extending, optionally threaded, wall 793 is provided thereon. An upper dimpled hole 794 having an optionally threaded downwardly extending wall 795 may be likewise provided, as best seen in FIG. 24a. Fixture fastener 788 may engage with both of holes 792, 794.

FIG. 25 shows another fixture mounting assembly 790 having an outwardly extending extension 792 for securing the box within concrete, in use.

FIGS. 26, 26a and 26b show an electrical fixture mounting assembly 795 which has a combination fixture fastening site or fastener attachment site or fixture alignment member or bracket 797 with an outwardly extending concrete engaging extension 796 thereon, in addition to fastener mounting member 780, as described above.

FIG. 26c shows another preferred embodiment of a mounting member 798 having a supplemental fixture fastener receiving hole 799 provided therein. Fixture fastener hole 799 will typically be of a different size so as to receive fixture fastener 792, such as a 8-32 screw, while the other fixture fastener hole will be sized to receive a 10-32 screw for securing a ceiling fan, for example.

FIG. 27 shows another fixture mounting assembly 800 having a combination fixture fastener site/alignment member or bracket 804 thereon. Mounting bracket 804 may include a lower plate 806 and an upper plate 808 with an internally threaded or female stud 810 extending therebetween. Female stud 810 may have a threaded hole 812 which extends entirely therethrough. Preferably, fixture fasteners will not extend out of the upper portion of threaded hole 812 and into the cavity of mounting assembly 800, so that no exposed threads are present in the cavity, as such exposed threads may lead to abrading/cutting of the plastic coating on typical plastic-coated wire. If a "live" wire contacts the metal fixture fastener, the fixture may be destroyed, or an unacceptable condition may arise. It is contemplated that an inwardly extending plate or extension 818 for securing female stud 810 may be constructed by cutting out and bending down a portion of the sidewall in the region of a window 820. Such a cut out or "blow out", as it is known in the trade, is readily performed. Given that assembly 800 is easily made of two halves, as are many of the other preferred embodiments, the window 820 may be formed in an overlapped portion of one of the halves, so that there is no open window 820 when assembly 800 is in its assembled state. Thus, no concrete will enter the cavity during use.

FIG. 28 shows another embodiment of an electrical fixture mounting assembly 825 including a sidewall 826 and an inwardly extending mounting bracket or extension 830 by which a corresponding lid 828 is attached, as described above.

FIG. 28a illustrates mounting member 804 of FIGS. 27 and 28 on an enlarged scale.

Figure 28D:
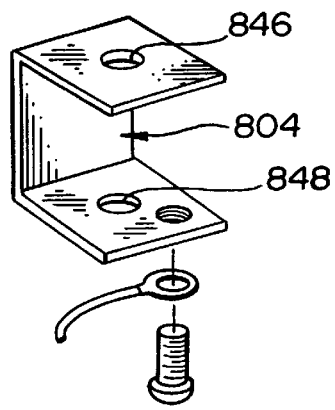

FIGS. 28b–28d show further variations of fastener attachment sites/mounting members.

For example, FIG. 28b shows a ground screw hole 838 provided in a plate 839 formed by cutting out a window 840 in wall 826 of a box. Female stud 810 extends through the sole plate 839. Such construction is suited for intended uses where the lower plate/extension 806 of FIGS. 27 and 28 is unnecessary, such as in lighter-duty uses, for example.

FIG. 28c shows the use of a plate 844, which may extend inwardly into the junction box cavity, and which is integral with an upwardly extending plate 842. During assembly, plate 842 will be welded, riveted, or partially punched out (see e.g., fastener 42 of FIG. 1) so as to be fixedly attached to the sidewall of the junction box.

Figure 29:
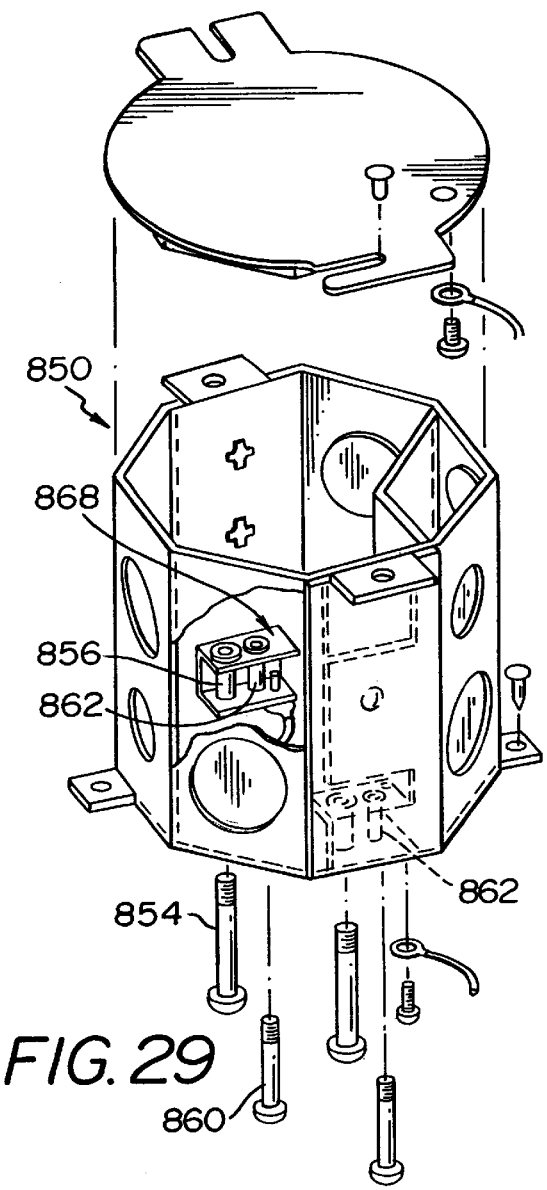
FIG. 29 is an exploded, perspective view of another preferred embodiment of an electrical fixture mounting assembly according to the invention.

FIG. 29 is another fixture mounting assembly 850 according to the invention. Mounting assembly 850 may include a fixture fastener 854, such as for ceiling fans, which mate with a female stud 856, and a further fastener 860 which mates with a female stud 862. Both female studs 856 and 862 will be secured in fixture mounting/alignment member 868.

Figure 30:
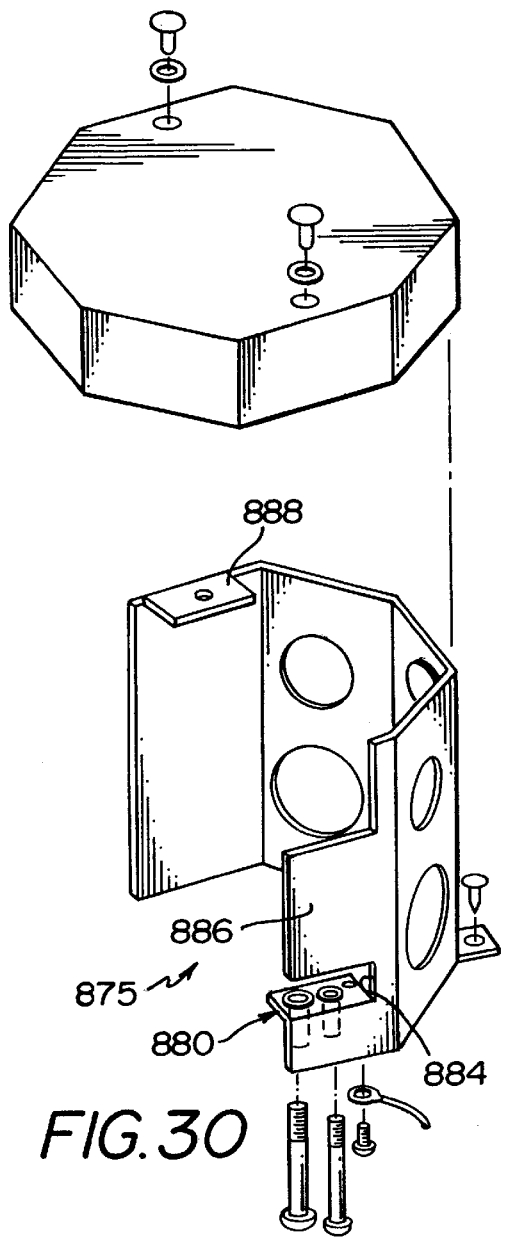
FIG. 30 is a perspective view of one half of another preferred embodiment of an electrical fixture mounting assembly according to the invention.
Figure 30A:
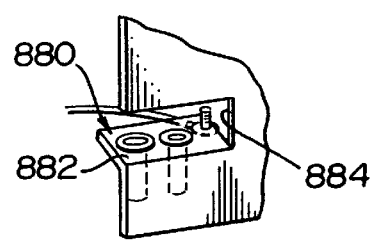
FIG. 30a illustrates the combination fixture attachment site or fastener attachment site or fixture alignment member of FIG. 30, on an enlarged scale.

FIGS. 30 and 30a show portions of a right side of a fixture mounting assembly 875 which includes a fixture fastening site or fastener attachment site or alignment member 880, and an inwardly extending plate which is cut out from a window 884 in the sidewall 886 of the junction box. As discussed above, an extension 888 may be provided for securing a plastic lid to, typically, the illustrated metal junction box.

FIG. 30a illustrates m ember 880 on an enlarged scale.

FIG. 31 shows a mounting assembly 900 having an elongated support 904 which includes an upper extension 908, a middle plate 912, and a lower, typically, inwardly extending plate 916. A female stud 920, which may be a fluted stud as described below in connection with FIG. 34, may be mounted on plate 916 for securing fixture fasteners. Good results have been achieved when plate 912 is attached to the sidewall of the junction box by use of a weld-free, stamped, punched connector 42, such as described above. A ground screw hole 924 may be provided. As in many of the other embodiments, the grounding wire will typically be attached from below, so that the user may secure the ground after the mounting assembly 900 has been installed in a substrate such as concrete.

FIG. 32 illustrates a mounting assembly 925 in which plate 904 is screwed or riveted to the sidewall at sites 930, which may be through holes, for example.

FIG. 33 shows an electrical fixture mounting assembly 950 in which a mounting plate 954 has an inwardly extending mounting bracket 958 for securing a plastic lid of the type described elsewhere.

FIG. 33a shows the fastener attachment/alignment member by itself, pointing out that an extra concrete support may be provided by punching out or cutting out a window 964 in plate 954.

Figure 34A:
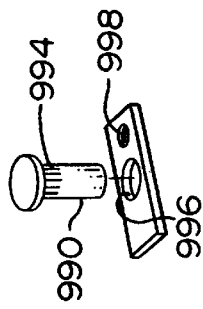
FIG. 34a is an exploded view of another preferred embodiment of a combination fastener attachment site/alignment member according to the invention.
Figure 34:
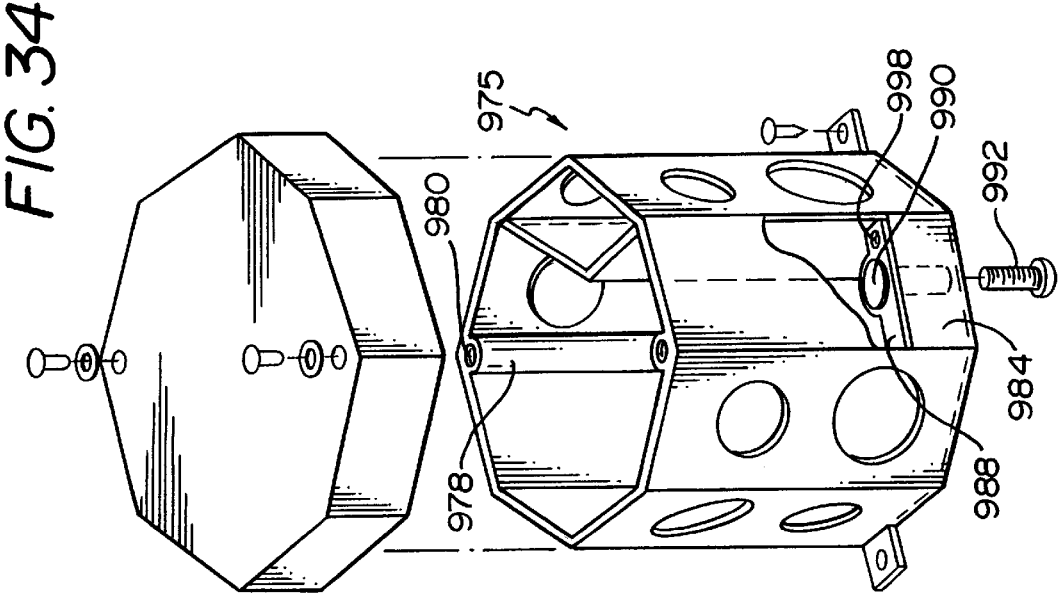
FIG. 34 is an exploded, perspective view of another preferred embodiment of an electrical fixture mounting assembly according to the invention.

FIG. 34 illustrates another embodiment of an electrical fixture mounting assembly 975 having raised portions or inwardly extending elements 978 extending into the cavity thereof. Raised or thickened portions 978 may be provided with threaded holes 980 by which the lid is secured to the junction box. The junction box may be made of metal or plastic, as may be the thickened portion 978. Additional thickened portions, or inwardly extending ledges 984 may be provided at a lower portion of the box. As with extension 978, portions 984 may be molded plastic or thickened portions of the metal or added pieces of material.

Female studs 990 will extend through portions 984. Studs 990 include a plurality of flutes or fluting 994 which engage with a hole 996 in plate 988. A threaded hole 998 may be provided for receiving a grounding screw therein.

Additional details of the manner in which such outwardly extending flutes 994 engage with one or both of hole 996 and portion 984 may be found in my earlier patent application entitled "Non-Metallic Electrical Box with Metallic Fixture Support", application Ser. No. 08/905,077, filed Aug. 1, 1997, and which is incorporated herein by reference.

Metal plate 988 strengthens portion 984 and provides for the mounting of fixtures with relatively high static and dynamic loads. In addition, when the junction box is made of plastic, the use of metal plate 988 provides for grounding of the fixture to the junction box. Namely, the electrical fixture is grounded to its own fixture housing, which is typically metal, and which housing is connected to female stud 990 by use of fixture fastener 992. Thus, an electrical pathway is formed between the fixture, then the fixture housing, then the fixture fastener 992, then the female stud 990, then metal plate 998, then threaded grounding hole 998, then the grounding screw and, hence, through the third, grounding wire of the standard three-wire wiring for powering electrical fixtures.

The use of fluting 994 reduces the likelihood that female stud 990 may turn relative to the junction box; hence, the connection between the electrical fixture and the junction box is more secure, as detailed in my earlier patent application referenced immediately above.

Fluting 994 also allows stud 990 to be installed by simply pressing or pushing stud 990 into portion 984 from above without the need for additional securement thereof.

Figure 35:
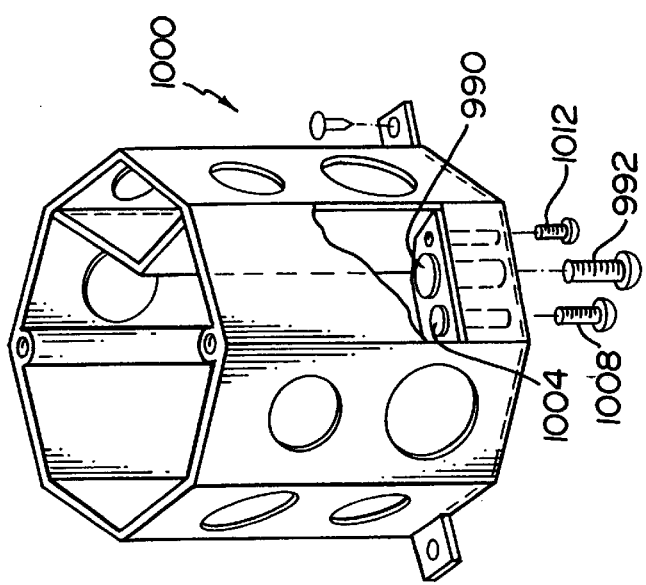
FIG. 35 is a perspective view of another preferred embodiment of an electrical fixture mounting assembly according to the invention.

FIG. 35 shows another fixture mounting assembly 1000 having a further female threaded stud 1004 in addition to female stud 990. Thus, a different type of fixture fastener 1008 may be secured to stud 1004, so that mounting assembly 1000 may alternately support two different types of fixtures. For example, as discussed above, female stud 1004 may be sized for supporting conventional light fixtures, while female stud 990 may be sized for supporting ceiling fans. Additional holes for securing ground screws 1012 may be provided.

FIG. 36 shows another fixture mounting assembly 1025 having a threaded hole 1030 provided for receiving fastener 1008, in place of stud 1004 of the embodiment of FIG. 35.

FIG. 36a illustrates details of another embodiment of a lid 1040 having a groove 1044 in a lower portion thereof, as shown in FIG. 36a in which one is up into lid 1040. A top wall 1046 is provided as in the above-described embodiments for preventing entry of water and concrete, for example, during use. Groove 1044 is configured for receiving a gasket 1048, which may be made of rubber or other suitable material, and which gasket ensures a well-sealed connection between lid 1040 and the junction box of the various embodiments of the invention.

FIG. 37 shows an electrical fixture mounting assembly 1050 in which an outwardly extending plate 1054 is provided so as to provide extra resistance to removal of the junction box from the concrete in which it is cast.

Figure 38A:
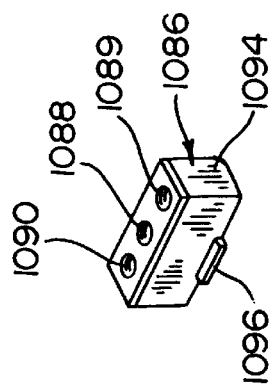
FIG. 38a is a perspective view of an element of FIG. 38.
Figure 38:
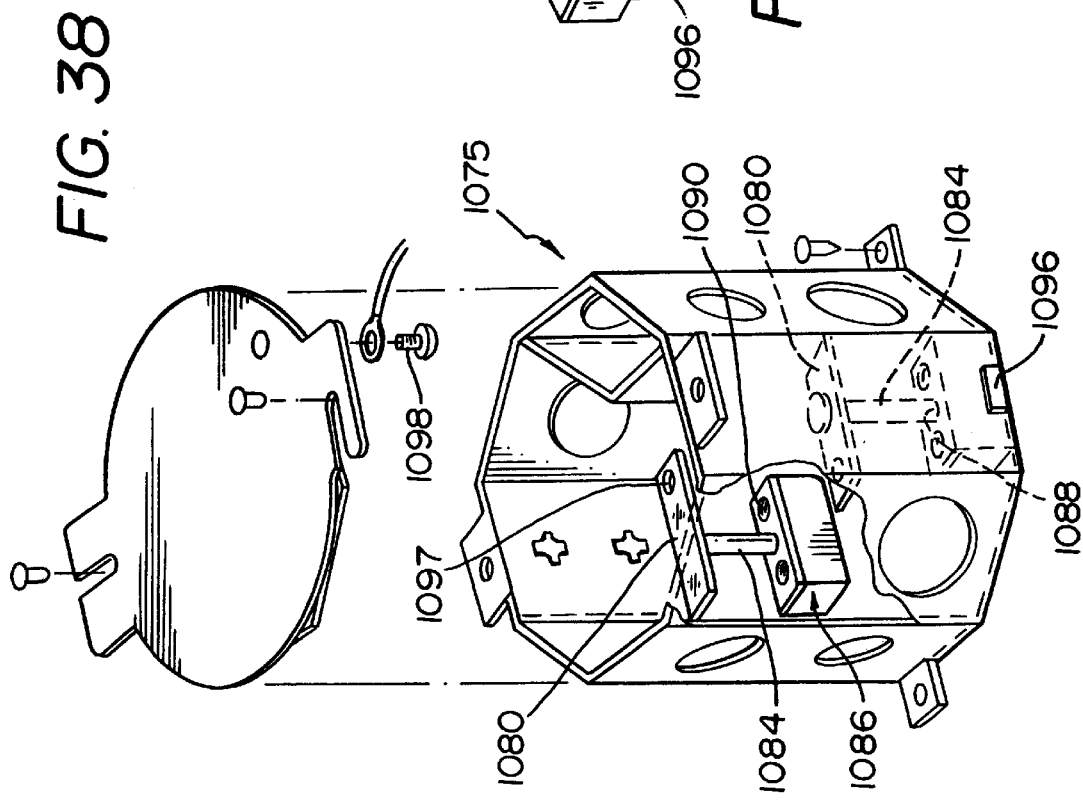
FIG. 38 is an exploded, perspective view of yet another preferred embodiment of an electrical fixture mounting assembly according to the invention.

FIGS. 38 and 38a show a mounting assembly 1075 having a fixture attachment site or plate 1080 provided therein.

An extension, such as an auxiliary fastener support 1084 extends downwardly from plate 1080 and supports an auxiliary fixture support 1086 at a connection site 1088. Connection site 1088 may be a threaded hole. A further threaded hole 1089 may be provided for receiving a first type of fixture fastener, and a further threaded hole 1090 may be provided for receiving a second type of fastener.

An optional extension 1096 may be provided for engaging with the sidewall of the junction box, and may be constructed as described in my earlier U.S. patent application Ser. No. 08/862,380, filed May 23, 1997, and which is incorporated herein by reference. A threaded hole 1097 may be provided on plate 1080. An optional ground screw 1098 may be provided for securing a ground to the lid.

Figure 39:
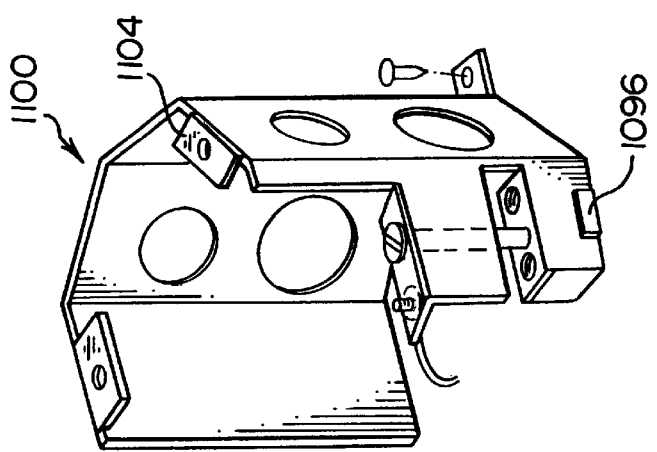
FIG. 39 is a perspective view of one half of another preferred embodiment of an electrical fixture mounting assembly according to the invention.

FIG. 39 illustrates the right half of another electrical fixture mounting assembly 1100 having a mounting bracket 1104 to which a plastic lid, which may be of the type described above, is attached.

It will be appreciated that each of the various ways of attaching fixtures, fixture supports, fixture fastening sites, fixture mounting members, and the various elements for reducing movement of fixture fasteners and secured fixtures may be interchanged within the scope of the invention.

It is further contemplated that female studs of various lengths be provided extending from the upper mounting bracket and/or the lower mounting brackets, depending on whether part or all of the fixture fasteners have external threads thereon.

OPERATION

Although it is believed that the use of the embodiments of FIGS. 1–39 is apparent from the above, a brief, select description follows.

Electrical fixture mounting assembly 10 of the preferred embodiment of FIGS. 1–6 is installed and used as follows.

The end user, such as a builder or homeowner, lays down a support, such as plywood P in a conventional manner that is sufficiently strong to support a ceiling/floor of a substrate S, for example, concrete.

In the case where junction box 14 will be embedded in the ceiling of a structure, a lower portion of concrete S will define the ceiling C, and an upper surface thereof will define a floor F of the room above, as will be readily understood.

The user places fixture mounting assembly 10 in the desired location, and secures mounting assembly 10 in place by fixing temporary tie down tab 110 relative to plywood P by use of fastener 184. Typically, both temporary tie down tabs 110 will be secured. Bottom 18 of junction box 14 will abut plywood P, and generally no seal is required therebetween.

Lid 54 is secured to top 16 of junction box 14 by fasteners 66 and 68. Conveniently, a seal, such as foam gasket 56 is disposed between lid 54 and top 16 -for preventing entry of water and concrete S during the pouring and curing thereof.

Substrate S, such as concrete, is then filled in on top of plywood P and around electrical fixture mounting assembly 10. Depending on local practice or the final intended use of junction box 14, the concrete will either completely entomb electrical fixture mounting assembly 10, or an indentation I within the concrete will be formed substantially above lid 54. After the concrete has cured, plywood P is removed, and fasteners 184 are typically likewise removed.

Figure 3:
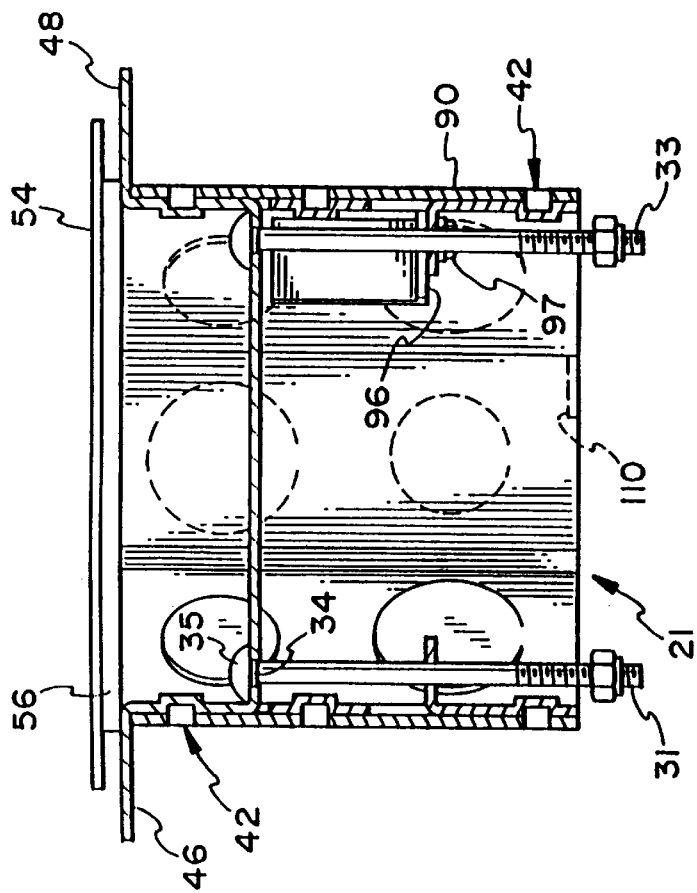
FIG. 3 is a side elevational view, partially in section, of the electrical fixture mounting assembly of the preferred embodiment of FIG. 1.
Figure 2:
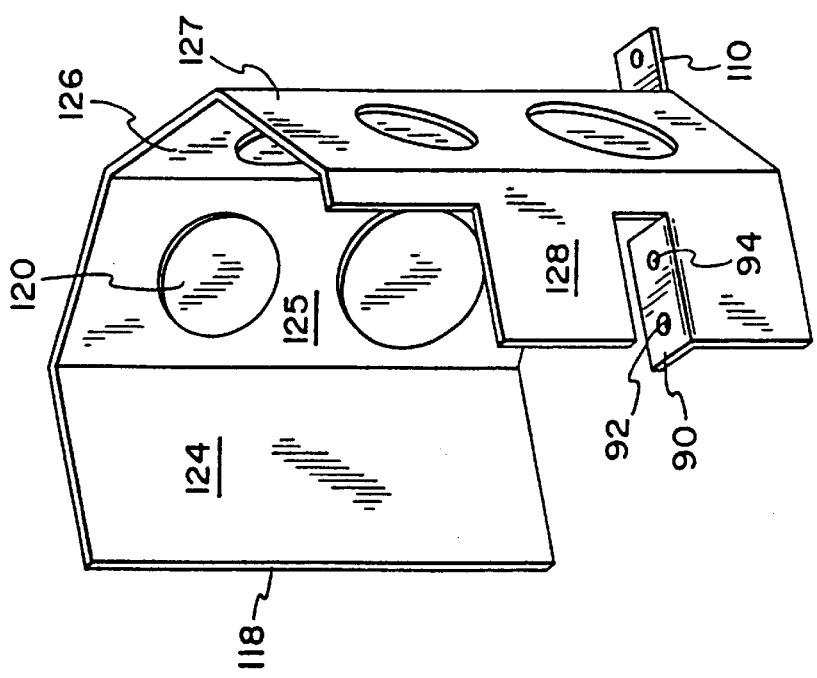
FIG. 2 is a perspective view of a portion of the sidewall of the junction box of the preferred embodiment of FIG. 1.
Figure 4:
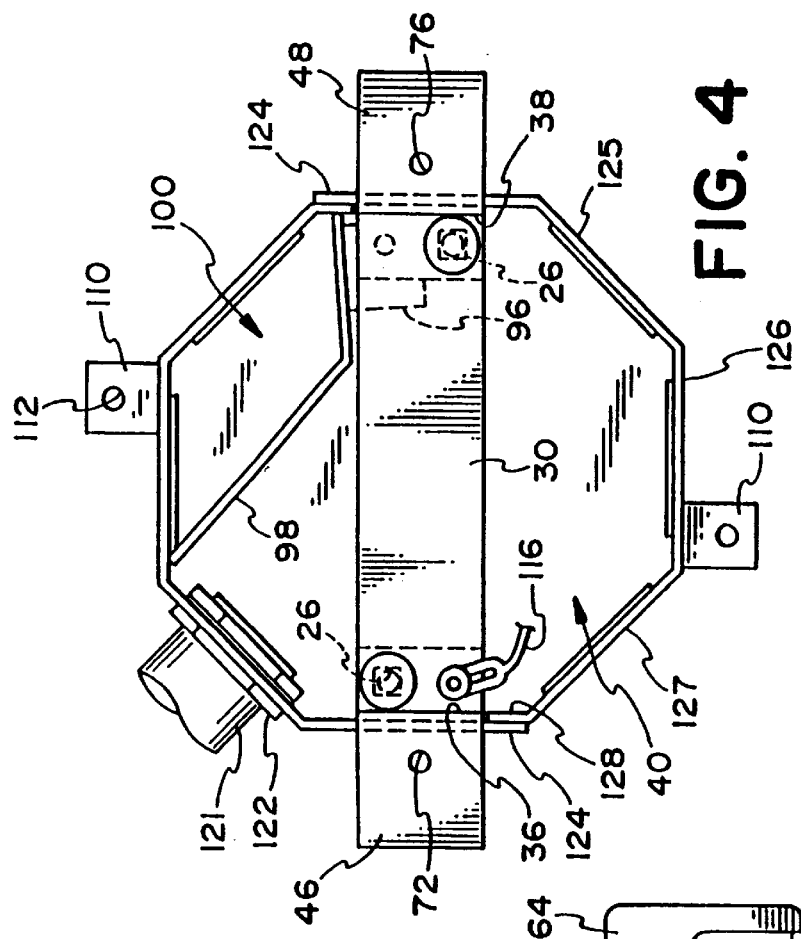
FIG. 4 is a top view of the preferred embodiment of the electrical fixture mounting assembly of FIG. 1.
Figure 5:
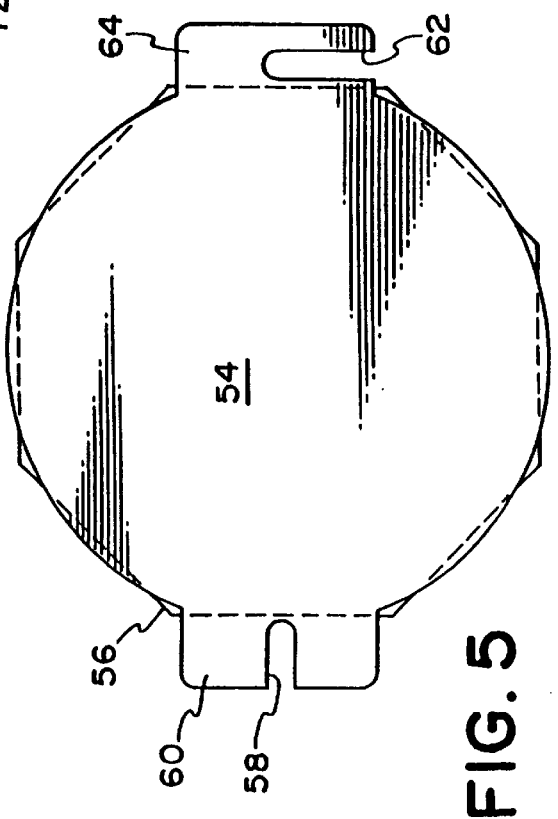
FIG. 5 is a plan view of a cover member for use with the preferred embodiment of the electrical fixture mounting assembly of FIG. 1, as installed.

Fasteners 31 and 33 are then moved downwardly and outwardly from their retracted positions (FIG. 6) to their extended positions (FIGS. 1, 3, and 9). In the case where two fasteners 31 and 33 are used, a transversely extending member, such as a rubber band R is used for biasing fasteners 31 and 33 slightly toward each other with sufficient force to maintain them in the retracted position. Preferably, rubber band R is attached at lower portions of fasteners 31 and 33, so that rubber band R can be removed from below by the user. It is likewise contemplated that no rubber band R be used, and the lower ends of fastener 31 and 33 will abut plywood P when concrete is being poured.

One or more pieces of conduit 121 (FIG. 4, omitted from FIGS. 6 and 9 for clarity) will have wires and cables extended therethrough, if such were not inserted at the time the conduit was installed, as is typical.

Auxiliary junction box 150 will typically be attached when there is a need for surface wiring along ceiling C and down an adjoining wall of a room, for example. In that case, one or more of knock-outs 153 would be removed, standard conduit attached, and wiring run.

The attachment of certain fixtures will necessitate the removal of knock-out 158 from cover 154, and the appropriate wire/communication lines run to an added-on fixture.

With the installation of typical ceiling fans, for example, auxiliary junction box 150 will not be used. The ceiling fan or other electrical appliance will be attached directly to electrical fixture mounting assembly 10 by use of one or both of fasteners 31 and 33.

Most ceiling fans, which exert relatively high loads and vibrations, will use both fasteners 31 and 33 at the same time.

Thanks to the novel structure of the invention, all such static and dynamic forces will be transferred directly from the mounted electrical appliance through fasteners 31 and 33, and then directly into the supporting ceiling C (i.e., substrate S, such as concrete). More specifically, the forces transmitted through fasteners 31 and 33 will be directed through transverse support 30, through vertical extensions 36, and then through extensions 46 and 48.

It will be noted that additional strength (i.e., resistance to the forces applied through bolts 31 and 33) will be provided by the feature that lid 54 overlaps and extends outwardly of sidewall 20. This structural feature which further reduces the likelihood of junction box 14 being loosened relative to substrate S, or even in extreme circumstances being completely pulled out of substrate S, can be appreciated from viewing FIGS. 3, 5, and 6.

It is further contemplated that the electrical fixture mounting assembly will be made of materials other than a galvanized steel, such as plastics, and the like.

It should be understood that the location of extensions 46 and 48 near top 16 of junction box 14 is merely one example of a means for carrying out my invention. It is likewise contemplated that extensions 46 and 48 will be located at any different position between top 16 and bottom 18 depending on the intended use, and on manufacturing constraints. It is also expected that the number of extensions will be varied, depending on the intended use of electrical fixture mounting assembly 10.

Likewise, it is contemplated that the size, configuration, and location of transverse support 30, for example will be varied as required.

It is further contemplated that the inwardly extending fastener guides on the auxiliary junction box will likewise be varied in height, number, and location, depending on the intended use, and manufacturing requirements. For example, it is contemplated that the fastener guides or fastener alignment member will be located spaced from the top of the auxiliary junction box, so that they can be stamped out of the subpanels of the sidewall thereof in a manner analogous to the formation of auxiliary bracket 90 of junction box 14.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and of the limits of the appended claims.

What is claimed is:

1. An electrical fixture mounting assembly comprising:
   a) a junction box having a top and a bottom;
   b) said junction box having a side wall defining a junction box cavity therein;
   c) a mounting bracket disposed adjacent said junction box;
   d) a fastener attachment site disposed on said mounting bracket;
   e) said fastener attachment site including a ledge disposed at a lower portion of said junction box;
   f) a hole extending into said ledge;
   g) a female fastener at least partially disposed in said hole; and
   h) a detachable lid disposed on said top of said junction box.

2. An electrical fixture mounting assembly as defined in claim 1, wherein:
   a) said junction box includes a plastic.

3. An electrical fixture mounting assembly as defined in claim 1, wherein:
   a) said fastener includes a further female fastener, said further female fastener differing in size from said female fastener.

4. A mounting assembly suited for installation in a concrete ceiling, comprising:
   a) a junction box having a top and an open bottom;
   b) said junction box having a side wall defining a junction box cavity therein;
   c) a detachable lid disposed on said top of said junction box;
   d) a seal disposed between said top of said junction box and said lid, said seal preventing the introduction of liquid into said junction box cavity;
   e) a fastener attachment site disposed within said junction box, said fastener attachment site being sized for attaching a first size of fixture fastener; and
   f) a fixture fastener attached to said fastener attachment site; and
   g) said fixture fastener being disposed for being extendable below said open bottom of said junction box.

5. A mounting assembly as defined in claim 4, wherein:
   a) at least one extension is provided on said junction box, said at least one extension being disposed at least partially outwardly of said side wall.

6. A mounting assembly as defined in claim 4, wherein:
   a) a grounding element is disposed on said lid.

7. A mounting assembly as defined in claim 4, wherein:
   a) said seal is provided on said lid.

8. A mounting assembly as in claim 4, wherein:
   a) said fastener attachment site is disposed on a mounting bracket disposed on said junction box.

9. A mounting assembly as defined in claim 8, wherein:
   a) said fastener attachment site is disposed within said junction box cavity.

10. A mounting assembly as defined in claim 4, wherein:
    a) a second fastener attachment site is disposed on said junction box; and
    b) said second fastener attachment site is spaced apart from said fastener attachment site.

11. A mounting assembly as defined in claim 10, wherein:
    a) said fastener attachment site and said second fastener attachment site are sized for attaching two different sizes of fasteners.

12. A mounting assembly as defined in claim 4, wherein:
    a) said seal includes a gasket.

13. A mounting assembly as defined in claim 12, wherein:
    a) said gasket includes a foam gasket.

14. A mounting assembly suited for installation in a concrete ceiling, comprising:
    a) a junction box having a top and an open bottom;
    b) said junction box having a side wall defining a junction box cavity therein;
    c) a detachable lid disposed on said top of said junction box;
    d) a seal disposed between said top of said junction box and said lid, said seal preventing the introduction of liquid into said junction box cavity; and
    e) a fastener attachment site disposed within said junction box, said fastener attachment site being sized for attaching a first size of fixture fastener.

15. A mounting assembly as defined in claim 14, wherein:
    a) at least one extension is provided on said junction box, said at least one extension being disposed at least partially outwardly of said side wall.

16. A mounting assembly as defined in claim 14, wherein:
    a) a grounding element is disposed on said lid.

17. A mounting assembly as defined in claim 14, wherein:
    a) said seal is provided on said lid.

18. A mounting assembly as defined in claim 14, wherein:
    a) said seal is disposed for preventing the introduction of concrete into the junction box cavity when the junction box is being cast in concrete.

19. A mounting assembly as defined in claim 14, wherein:
    a) said seal includes a polygonal configuration.

20. A mounting assembly as defined in claim 14, wherein:
    a) said lid extends outwardly of said side wall; and
    b) said lid extends sufficiently outwardly of said side wall for preventing said lid and said junction box attached thereto from being pulled out of concrete in which it is installed by forces acting downwardly on said junction box during use.

21. A mounting assembly as defined in claim 14, wherein:
    a) said seal includes a gasket.

22. A mounting assembly as defined in claim 21, wherein:
    a) said gasket includes a foam gasket.

23. A mounting assembly as defined in claim 14, wherein:
    a) said fastener attachment site includes a female stud.

24. A mounting assembly as defined in claim 23, wherein:
a) said female stud includes a threaded opening.

25. A mounting assembly as defined in claim 14, wherein:
a) a subcavity is provided in said junction box.

26. A mounting assembly as defined in claim 25, wherein:
a) said subcavity is sized for receiving communication lines separate from the remainder of the junction box cavity.

27. A mounting assembly as in claim 14, wherein:
a) said fastener attachment site is disposed on a mounting bracket disposed on said junction box.

28. A mounting assembly as defined in claim 27, wherein:
a) said fastener attachment site is disposed within said junction box cavity.

29. A mounting assembly as defined in claim 27, wherein:
a) said seal is disposed for preventing the introduction of water into the junction box cavity when the junction box is being cast in concrete.

30. A mounting assembly as defined in claim 14, wherein:
a) a second fastener attachment site is disposed on said junction box; and
b) said second fastener attachment site is spaced apart from said fastener attachment site.

31. A mounting assembly as defined in claim 30, wherein:
a) said fastener attachment site and said second fastener attachment site are sized for attaching two different sizes of fasteners.

32. A mounting assembly as defined in claim 30, wherein:
a) said fastener attachment site includes a female stud.

33. A mounting assembly as defined in claim 32, wherein:
a) said second fastener site includes an opening.

34. A mounting assembly as defined in claim 14, wherein:
a) said seal includes a octagonal configuration.

35. A mounting assembly as defined in claim 34, wherein:
a) said top of said junction box has an octagonal configuration; and
b) said octagonal seal mates with said octagonal configuration of said top of said box.

36. A mounting assembly as defined in claim 35, wherein:
a) said top of said junction box has an open configuration.

37. A mounting assembly as defined in claim 36, wherein:
a) said top of said junction box has an octagonal open configuration.

38. A mounting assembly suited for installation in a concrete ceiling, comprising:
a) a junction box having a top and an open bottom;
b) said junction box having a side wall defining a junction box cavity therein;
c) a detachable lid disposed on said top of said junction box;
d) a fastener attachment site disposed within said junction box, said fastener attachment site being sized for attaching a first size of fixture fastener; and
e) a fixture fastener attached to said fastener attachment site; and
f) said fixture fastener being disposed for being extendable below said open bottom of said junction box.

39. A mounting assembly as defined in claim 38, wherein:
a) said seal includes a gasket.

40. A mounting assembly as defined in claim 38, wherein:
a) a second fastener attachment site is disposed on said junction box; and
b) said second fastener attachment site is spaced apart from said fastener attachment site.

41. A mounting assembly as defined in claim 40, wherein:
a) said fastener attachment site and said second fastener attachment site are sized for attaching two different sizes of fasteners.

42. A mounting assembly suited for installation in a concrete ceiling, comprising:
a) a junction box having a top and an open bottom;
b) said junction box having a side wall defining a junction box cavity therein;
c) a detachable lid disposed on said top of said junction box;
d) a seal disposed between said top of said junction box and said lid, said seal preventing the introduction of liquid into said junction box cavity;
e) a fastener attachment site disposed on said junction box, said fastener attachment site being sized for receiving a first size of fastener;
f) a further fastener attachment site disposed on said junction box, said further attachment site being sized for receiving a second size of fastener differing from the first size of fastener; and
g) said further fastener attachment site being spaced apart from said fastener attachment site.

43. A mounting assembly as defined in claim 42, wherein:
a) said lid extends outwardly of said side wall; and
b) said lid extends sufficiently outwardly of said side wall for preventing said lid and said junction box attached thereto from being pulled out of concrete in which it is installed by forces acting downwardly on said junction box during use.

44. A mounting assembly suited for installation in a concrete ceiling, comprising:
a) a junction box having a top and an open bottom;
b) said junction box having a side wall defining a junction box cavity therein;
c) a detachable lid disposed on said top of said junction box;
d) a seal disposed between said top of said junction box and said lid, said seal preventing the introduction of liquid into said junction box cavity;
e) a fastener attachment site disposed on said junction box;
f) said lid extending outwardly of said side wall; and
g) said lid extending sufficiently outwardly of said side wall for preventing said lid and said junction box attached thereto from being pulled out of concrete in which it is installed by forces acting downwardly on said junction box during use.

* * * * *